United States Patent
Vajapeyam et al.

(10) Patent No.: US 10,462,758 B2
(45) Date of Patent: Oct. 29, 2019

(54) TIMING ALIGNMENT PROCEDURES FOR DUAL PUCCH

(71) Applicant: QUALCOMM Incorporated, San Diego, CA (US)

(72) Inventors: Madhavan Srinivasan Vajapeyam, San Diego, CA (US); Wanshi Chen, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/818,107

(22) Filed: Aug. 4, 2015

(65) Prior Publication Data
US 2016/0044617 A1    Feb. 11, 2016

Related U.S. Application Data

(60) Provisional application No. 62/033,593, filed on Aug. 5, 2014.

(51) Int. Cl.
*H04W 56/00*    (2009.01)
*H04W 74/00*    (2009.01)
*H04W 76/15*    (2018.01)

(52) U.S. Cl.
CPC ... *H04W 56/0005* (2013.01); *H04W 56/0045* (2013.01); *H04W 74/004* (2013.01); *H04W 76/15* (2018.02)

(58) Field of Classification Search
CPC ......... H04W 56/0005; H04W 56/0045; H04W 74/004; H04W 76/025

(Continued)

(56) References Cited

U.S. PATENT DOCUMENTS

2012/0257570 A1* 10/2012 Jang ................... H04W 76/19
                                                        370/328
2013/0114574 A1*  5/2013 Ng ..................... H04W 56/0015
                                                        370/336

(Continued)

FOREIGN PATENT DOCUMENTS

CN    102014480 A    4/2011
CN    102651907 A    8/2012

(Continued)

OTHER PUBLICATIONS

TDM UL transmission for TDD-FDD DL CA-capable UE with single transmitter; 3GPP TSG-RAN WG1 Meeting #76; Prague, CZ Rep., Feb. 10-14, 2014; from Applicant's IDS.*

(Continued)

*Primary Examiner* — Melvin C Marcelo
*Assistant Examiner* — Natali Pascual Peguero
(74) *Attorney, Agent, or Firm* — Holland & Hart LLP/Qualcomm Incorporated

(57) ABSTRACT

Methods, systems, and devices are described for wireless communication. A base station may configure a set of timing adjustment groups (TAGs) and a set of PUCCH cell groups for a user equipment (UE). The serving cells in the TAGs may be associated with different PUCCH cell groups. The UE may initiate a time alignment timer for each TAG, and if the timer expires prior to receiving a timing adjustment command, the UE may initiate a timing alignment procedure for a subset of serving cells based on the association between the TAGs and the PUCCH cell groups.

32 Claims, 17 Drawing Sheets

(58) Field of Classification Search
USPC .................................. 370/310, 321, 336, 337
See application file for complete search history.

(56) References Cited

U.S. PATENT DOCUMENTS

| | | | | |
|---|---|---|---|---|
| 2013/0188473 | A1* | 7/2013 | Dinan | H04W 56/0005 370/216 |
| 2014/0119304 | A1* | 5/2014 | Li | H04W 52/146 370/329 |
| 2014/0192775 | A1* | 7/2014 | Li | H04W 36/0072 370/331 |
| 2015/0036666 | A1* | 2/2015 | Blankenship | H04W 72/044 370/336 |
| 2015/0334637 | A1* | 11/2015 | Kim | H04W 48/12 370/312 |

FOREIGN PATENT DOCUMENTS

| | | |
|---|---|---|
| EP | 2849359 A1 | 3/2015 |
| WO | WO-2013169048 A2 | 11/2013 |

OTHER PUBLICATIONS

Ericsson, "Time Alignment for Dual Connectivity," 3GPP TSG-RAN WG2 #85bis, Valencia, Spain, Mar. 31-Apr. 4, 2014, 4 pgs., Tdoc R2-141162, 3rd Generation Partnership Project.

ISA/EPO, International Search Report and Written Opinion of the International Searching Authority, Int'l. App. No. PCT/US2015/043787, dated Oct. 16, 2015, European Patent Office, Rijswijk, NL, 14 pgs.

Mediatek Inc., "TDM UL Transmission for TDD-FDD UL CA-capable UE with Single Transmitter," 3GPP TSG-RAN WG1 Meeting #76, Prague, CZ, Feb. 10-14, 2014, 4 pgs., R1-140236, 3rd Generation Partnership Project.

Mazzarese, "LS on the Support of PUCCH on Two Serving Cells in CA," 3GPP TSG RAN WG1 Meeting #77, Seoul, Korea, May 19-23, 2014, 2 pgs., R1-142769, 3rd Generation Partnership Project.

Alcatel-Lucent: "Impact of Dual Connectivity on RRM Performance Requirements", 3GPP TSG-RAN WG4 #71 R4-143602, 3GPP, May 12, 2014, 3 pages.

Nsn et al., "TAG for Dual Connectivity", 3GPP TSG-RAN WG2 #86, R2-142092, 3GPP, May 9, 2014, 5 pages.

Qualcomm Incorporated: "Air Interface Considerations for Dual Connectivity", 3GPP TSG-RAN WG2#81 R2-130266, 3GPP, Jan. 18, 2013, 3 pages.

Qualcomm Incorporated: 'Air interface considerations for dual connectivity', 3GPP Draft; R2-131159; 3rd Generation Partnership Project (3GPP), Mobile Competence Centre; 650, Route Des Lucioles; F-06921 Sophia-Antipolis Cedex; France f vol. RAN W62, No. #81bis Apr. 4, 2013 (Apr. 4, 2013), XP050699140, Retrieved from the Internet: URL:http://www.3gpp.org/ftp/tsg_ran/WG2_RL2/TSGR2_81bisiDocs/, 3 pages.

* cited by examiner

US 10,462,758 B2

TIMING ALIGNMENT PROCEDURES FOR DUAL PUCCH

CROSS REFERENCES

The present Application for Patent claims priority to U.S. Provisional Patent Application No. 62/033,593 by Vajapeyam et al., entitled "Timing Alignment Procedures for Dual PUCCH," filed Aug. 5, 2014, assigned to the assignee hereof, and expressly incorporated by reference herein.

BACKGROUND

Field of the Disclosure

The present disclosure, for example, relates to wireless communication, and more specifically to timing alignment procedures for dual physical uplink control channel (PUCCH).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

By way of example, a wireless multiple-access communications system may include a number of base stations, each simultaneously supporting communication for multiple communication devices, which may be otherwise known as a UE. A base station may communicate with user equipments (UEs) on downlink channels (e.g., for transmissions from a base station to a UE) and uplink channels (e.g., for transmissions from a UE to a base station). A UE may adjust uplink (UL) transmissions to account for propagation delay between the UE and the base station. For example, a base station may send a time alignment command directing the UE to transmit UL messages slightly earlier than a default synchronization time to account for the time it takes UL message to reach the base station.

SUMMARY

The present disclosure relates generally to wireless communication systems, and more particularly to systems, methods, and/or apparatuses for timing alignment procedures for dual physical uplink control channel (PUCCH). A base station may configure a set of timing adjustment groups (TAGs) and a set of PUCCH cell groups for a user equipment (UE). Serving cells in the TAGs may be associated with different PUCCH cell groups. The UE may initiate a time alignment timer for each TAG, and if the timer expires prior to receiving a timing adjustment command, the UE may initiate a timing alignment procedure for a subset of serving cells based on the association between the TAGs and the PUCCH cell groups. For example, the UE may determine which PUCCH cells are in the TAG with the expired timer and perform a timing alignment procedure for the PUCCH cell groups of those PUCCH cells.

A method of timing alignment procedures for dual PUCCH is described. The method may include identifying a set of TAGs, identifying a set of PUCCH cell groups comprising a first PUCCH cell group and a second PUCCH cell group, and determining a timing alignment procedure based on an association between the set of TAGs and the set of PUCCH cell groups.

An apparatus for timing alignment procedures for dual PUCCH is described. The apparatus may include means for identifying a set of TAGs, means for identifying a set of PUCCH cell groups comprising a first PUCCH cell group and a second PUCCH cell group, and means for determining a timing alignment procedure based on an association between the set of TAGs and the set of PUCCH cell groups.

An apparatus for timing alignment procedures for dual PUCCH is described. The apparatus may include a processor, memory in electronic communication with the processor, and instructions stored in the memory, wherein the instructions are executable by the processor to identify a set of TAGs, identify a set of PUCCH cell groups comprising a first PUCCH cell group and a second PUCCH cell group, and determine a timing alignment procedure based on an association between the set of TAGs and the set of PUCCH cell groups.

A non-transitory computer-readable medium storing code for timing alignment procedures for dual PUCCH is also described. The code may include instructions executable by a processor to identify a set of TAGs, identify a set of PUCCH cell groups comprising a first PUCCH cell group and a second PUCCH cell group, and determine a timing alignment procedure based on an association between the set of TAGs and the set of PUCCH cell groups.

Some examples of the method, apparatuses, and/or non-transitory computer-readable medium described above may further include features of, means for, and/or processor-executable instructions for initiating a time alignment timer for each TAG of the set of TAGs, and performing the timing alignment procedure for serving cells of at least one of the first or second PUCCH cell groups upon expiration of the time alignment timer. In some examples the timing alignment procedure comprises at least one of notifying a radio resource control (RRC) control to release a PUCCH in a PUCCH-enabled cell; notifying the RRC control entity to release an SRS; flushing a hybrid automatic repeat request (HARD) buffer for a serving cell; clearing a downlink (DL) assignment for a serving cell; or clearing an uplink (UL) grant for a serving cell.

Some examples of the method, apparatuses, and/or non-transitory computer-readable medium described above may further include features of, means for, and/or processor-executable instructions for identifying an association between the first and second PUCCH cell groups and a primary TAG (pTAG), and the set of TAGs consists of the pTAG. Some examples include initiating a time alignment timer for the pTAG and performing a timing alignment procedure for serving cells of the first and second PUCCH cell groups upon expiration of the time alignment timer. Other examples may include identifying an association between a primary TAG (pTAG) and the first PUCCH cell group, identifying an association between a PUCCH secondary TAG (psTAG) and the second PUCCH cell group, and the set of TAGs comprises the pTAG and the psTAG. Additionally, some examples may include initiating a first time alignment timer for the pTAG and a second time alignment timer for the psTAG, and performing a timing alignment procedure for serving cells of the first PUCCH cell group upon expiration of the first time alignment timer or for serving cells of the second PUCCH cell group upon expiration of the second time alignment timer.

Some examples of the method, apparatuses, and/or non-transitory computer-readable medium described above may further include features of, means for, and/or processor-executable instructions for identifying an association between a secondary TAG (sTAG) and either the first or second PUCCH cell groups, and the set of TAGs comprises the sTAG. Some examples may include identifying an association between a first serving cell of a secondary TAG (sTAG) and the first PUCCH cell group, identifying an association between a second serving cell of the sTAG and the second PUCCH cell group, and the set of TAGs comprises the sTAG.

In some examples of the method, apparatuses, and/or non-transitory computer-readable medium described above the first PUCCH cell group is a set of serving cells comprising a primary cell (PCell), and the second PUCCH cell group is a set of serving cells comprising a PUCCH-enabled secondary cell (PSCell). In some examples, the association between the set of TAGs and the set of PUCCH cell groups is asymmetric.

A further method of timing alignment procedures for dual PUCCH is described. The method may include configuring a primary timing adjustment group (pTAG) for a user equipment (UE), configuring a set of PUCCH cell groups for the UE, the set of PUCCH cell groups comprising a first PUCCH cell group and a second PUCCH cell group, and associating a first set of serving cells of the pTAG with the first PUCCH cell group.

A further apparatus for timing alignment procedures for dual PUCCH is described. The apparatus may include means for configuring a primary timing adjustment group (pTAG) for a UE, means for configuring a set of PUCCH cell groups for the UE, the set of PUCCH cell groups comprising a first PUCCH cell group and a second PUCCH cell group, and means for associating a first set of serving cells of the pTAG with the first PUCCH cell group.

A further apparatus for timing alignment procedures for dual PUCCH is described. The apparatus may include a processor, memory in electronic communication with the processor, and instructions stored in the memory, wherein the instructions are executable by the processor to configure a primary timing adjustment group (pTAG) for a UE, configure a set of PUCCH cell groups for the UE, the set of PUCCH cell groups comprising a first PUCCH cell group and a second PUCCH cell group, and associate a first set of serving cells of the pTAG with the first PUCCH cell group.

A further non-transitory computer-readable medium storing code for timing alignment procedures for dual PUCCH is also described. The code may include instructions executable by a processor to configure a primary timing adjustment group (pTAG) for a UE, configure a set of PUCCH cell groups for the UE, the set of PUCCH cell groups comprising a first PUCCH cell group and a second PUCCH cell group, and associate a first set of serving cells of the pTAG with the first PUCCH cell group.

Some examples of the method, apparatuses, and/or non-transitory computer-readable medium described above may further include features of, means for, and/or processor-executable instructions for associating a second set of serving cells of the pTAG with the second PUCCH cell group. In some examples the first PUCCH cell group and the second PUCCH cell group consist of serving cells for the UE.

Some examples of the method, apparatuses, and/or non-transitory computer-readable medium described above may further include features of, means for, and/or processor-executable instructions for configuring a PUCCH secondary TAG (psTAG) for the UE, and associating the psTAG with the second PUCCH cell group. Some examples may include configuring a secondary TAG (sTAG) for the UE, and associating the sTAG with either the first or second PUCCH cell groups.

Some examples of the method, apparatuses, and/or non-transitory computer-readable medium described above may further include features of, means for, and/or processor-executable instructions for configuring a secondary TAG (sTAG) for the UE, associating a first set of serving cells of the sTAG with the first PUCCH cell group, and associating a second set of serving cells of the sTAG with the second PUCCH cell group. In some examples, the first PUCCH cell group is a set of serving cells comprising a primary cell (PCell), and the second PUCCH cell group is a set of serving cells comprising a PUCCH-enabled secondary cell (PSCell).

Some examples of the method, apparatuses, and/or non-transitory computer-readable medium described above may further include features of, means for, and/or processor-executable instructions for initiating a time alignment timer for the pTAG and a PUCCH secondary TAG (psTAG). Some examples may include initiating a time alignment timer for a secondary TAG (sTAG).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A user equipment (UE) may be in communication with multiple cells, which in some cases may be associated with multiple base stations. The cells serving the UE may be grouped in timing adjustment groups (TAGs) that have different timing offsets. For example, a UE may communicate with one base station that is nearby, and with another base station that is further away. The timing offset for cells associated with the nearby base station may be less than that for cells associated with the far base station.

In some cases, a UE may determine that a timing alignment for a TAG has become unreliable (e.g., if the UE has not received a timing alignment command in a sufficiently long time.) The UE may then initiate a timing synchronization or re-alignment procedure and attempt to establish a new offset. In some cases, a UE may lose timing alignment for one TAG, but not for another TAG. An inefficient timing alignment algorithm may cause the UE (and the base stations) to waste time and energy by performing re-alignment procedures for cells that are still in alignment, or by not performing the procedures for cells that are out of alignment.

In some cases, a UE may be configured with several TAGs and several physical uplink control channel (PUCCH) cell groups. The serving cells in the TAGs may be associated with different PUCCH cell groups. The UE may initiate a time alignment timer for each TAG; and if the timer expires prior to receiving a timing adjustment command, the UE may initiate a timing alignment procedure for a subset of serving cells based on the association between the TAGs and the PUCCH cell groups. For example, the UE may determine which PUCCH cells are in the TAG with the expired timer and perform a timing alignment procedure for the PUCCH cell groups of those PUCCH cells.

Thus, if a UE loses timing alignment for one TAG but not for another TAG, the UE may select a subset of serving cells for which to perform a synchronization or re-alignment procedures (e.g., Random Access Channel (RACH) procedure). This may allow the UE and the base station or base stations associated with the serving cells to conserve time, energy, and physical layer resources by performing re-alignment procedures for cells that are not in alignment, and by not performing the procedures for cells that are still in alignment.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
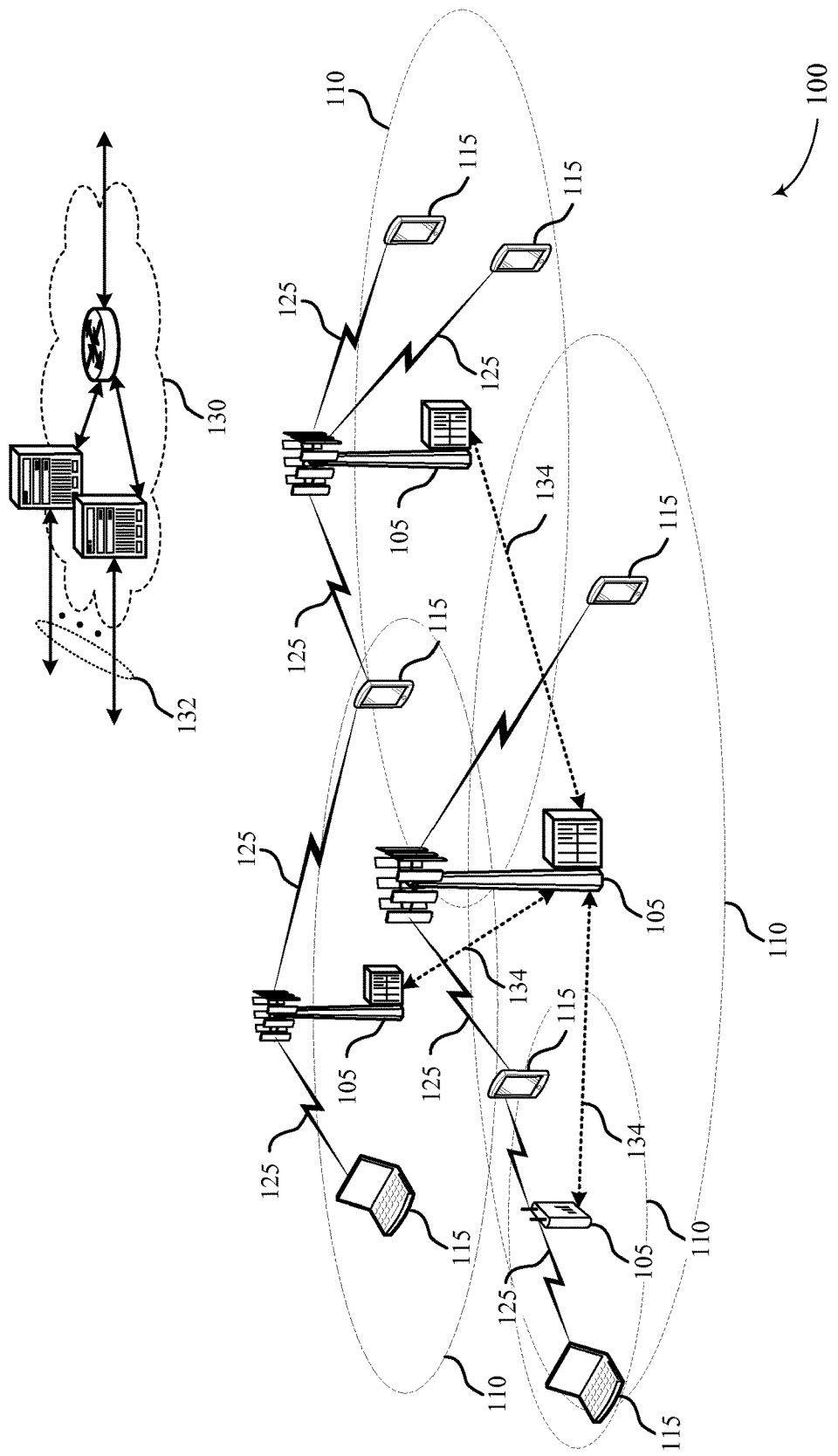
FIG. 1 illustrates an example of a wireless communications system in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies. Base stations 105 may be associated with different TAGs and/or different PUCCH cell groups, as described below.

In some examples, the wireless communications system 100 is a Long Term Evolution (LTE)/LTE-Advanced (LTE-A) network. In LTE/LTE-A networks, the term eNB may be generally used to describe the base stations 105, while the term UE may be generally used to describe the UEs 115. The wireless communications system 100 may be a Heterogeneous LTE/LTE-A network in which different types of evolved node Bs (eNBs) provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). Both TAGs and PUCCH cell groups may include cells supported by various eNBs.

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105 or core network 130 supporting radio bearers for the user plane data. At the PHY layer, the transport channels may be mapped to Physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each of the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. In some examples, the communication links 125 represent multiple serving cells.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation CA or multi-carrier operation. A carrier may also be referred to as a component carrier CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. In some examples, carriers may be aggregated in PUCCH cell groups.

The term "component carrier" may refer to each of the multiple carriers utilized by a UE in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated and/or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss). In some cases, multiple DL CCs may be associated with a single UL CC. For example, in some cases one UL CC may support ACK/NAK transmission on PUCCH for up to 5 DL CCs.

In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/negative ACK (NACK), channel quality indicator (CQI), and scheduling information transmitted on physical uplink control channel (PUCCH), are carried by the primary cell. Additional carriers may be designated as secondary carriers, or secondary component carriers (SCCs), which may be associated with secondary cells (SCells). SCells may likewise be semi-statically configured on a per-UE basis. SCells may not be configured to transmit the same control information as the primary cell.

In some cases, a UE 115 may be served by cells from two or more base stations 105 that are connected by a non-ideal backhaul 134 in dual connectivity operation. For example, the connection between the serving base stations 105 may not be sufficient to facilitate precise timing coordination. Thus, in some cases, the cells serving a UE 115 may be divided into multiple TAGs. Each TAG may be associated with a different timing offset, such that the UE 115 may synchronize UL transmissions differently for different UL carriers. According to the present disclosure, different TAGs may also be established for CA operation (e.g., for operations using a single base station or multiple base stations with an ideal backhaul). In some cases, the TAG associated with the PCell may be known as a primary TAG (pTAG), and a TAG other than the pTAG may be known as a secondary TAG (sTAG). According to aspects of the present disclosure, an SCell may be configured for PUCCH transmissions along with a PCell. Thus, in some case, a UE 115 is configured with both a PCell and a PUCCH-enabled SCell. The PUCCH enabled SCell may be known as a PSCell, and the TAG associated with the PSCell may be known as a PUCCH secondary TAG (psTAG).

UL timing alignment may be used by a UE 115 to transmit messages associated with a physical uplink shared channel (PDSCH), the PUCCH, and reference signals such as a sounding reference signal (SRS). PDSCH may be used for transmitting UL user data. PUCCH may include UL control information such as CQI, ACK/NACK, and scheduling requests (SRs). An SRS may be used so that a base station 105 may establish timing alignment and estimate the UL channel quality.

The PUCCH may be mapped to a control channel defined by a code and two consecutive resource blocks. UL control signaling may depend on the presence of timing synchronization for a cell. PUCCH resources for SR and CQI reporting may be assigned (and revoked) through RRC signaling. In some cases, resources for SR may be assigned after acquiring synchronization through a random access channel (RACH) procedure. In other cases, an SR may not be assigned to a UE 115 through the RACH (e.g., synchronized UEs may or may not have a dedicated SR channel). PUCCH resources for SR and CQI may be lost when the UE is no longer synchronized.

An SRS may be transmitted by UE 115 using a predetermined sequence (e.g., a Zadoff-Chu sequence). In some cases, an SRS transmission may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS.

Thus, data gathered by a base station 105 from an SRS may be used to inform an UL scheduler. A base station 105 may also utilize an SRS to check timing alignment status in order to send time alignment commands to the UEs 115.

According to aspects of the present disclosure, a base station may configure a set of TAGs and a set of PUCCH cell groups for a UE. The serving cells in the TAGs may be associated with different PUCCH cell groups. The UE may initiate a time alignment timer for each TAG. If a UE 115 misses one or more timing alignment commands for a TAG, the associated timer could expire. If the timer expires, the UE may initiate a timing alignment procedure for a subset of serving cells based on the association between the TAGs and the PUCCH cell groups. That is, the time alignment timer may be used to control how long the UE 115 considers the serving cells belonging to an associated TAG to be uplink-time aligned. For example, the UE may determine which PUCCH cells are in the TAG with the expired timer and perform a timing alignment procedure for the PUCCH cell groups of those PUCCH cells.

Figure 2A:
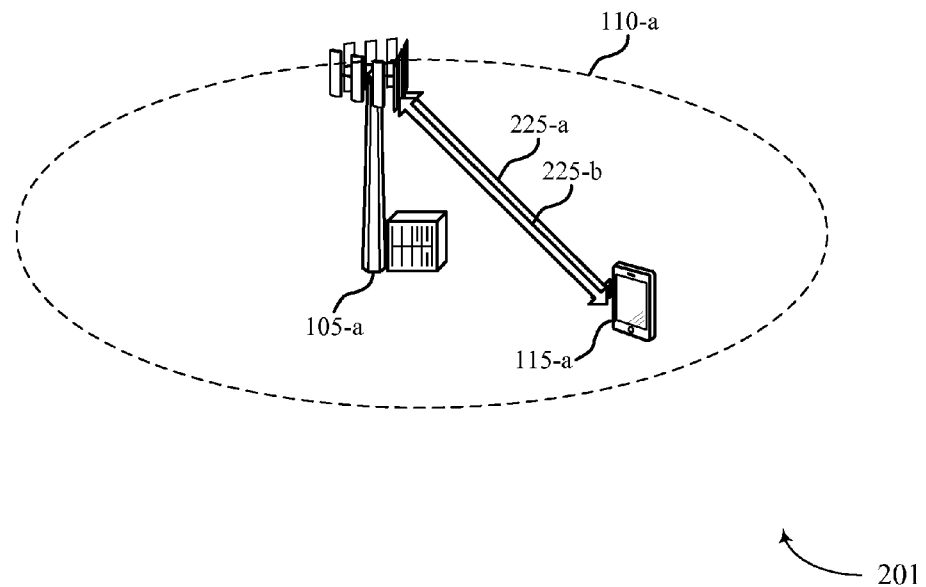
FIG. 2A illustrates an example of a wireless communication system for timing alignment procedures for dual PUCCH in accordance with various aspects of the present disclosure.

FIG. 2A illustrates an example of a wireless communication system 201 for timing alignment procedures for dual PUCCH in accordance with various aspects of the present disclosure. Wireless communication system 201 may be illustrate aspects of the wireless communications system 100 of FIG. 1, and it may include a base station 105-*a* with coverage area 110-*a* and a UE 115-*a*. The base station 105-*a* may communicate with UE 115-*a* using a PCell 225-*a* and an SCell 225-*b*. SCell 225-*b* may be a PSCell (e.g., a PUCCH-enabled SCell).

PCell 225-*a* and PSCell 225-*b* may be associated with the same TAG (the pTAG). However, PCell 225-*a* and PSCell 225-*b* may be associated with different PUCCH cell groups (CGs). In some cases, additional CCs (not shown) in the pTAG may be associated with PCell 225-*a* in a first PUCCH cell group, and other CCs in the pTAG may be associated with PSCell 225-*b* in a second PUCCH cell group.

According to aspects of the present disclosure, base station 105-*a* may configure the pTAG and a set of PUCCH cell groups for UE 115-*a*. The PUCCH-enabled serving cells in the pTAG (e.g., PCell 225-*a* and PSCell 225-*b*) may be associated with different PUCCH cell groups. If the time alignment timer for the pTAG expires, UE 115-*a* may determine which PUCCH enabled cells are in the pTAG and perform a timing alignment procedure for the associated PUCCH cell groups.

Figure 2B:
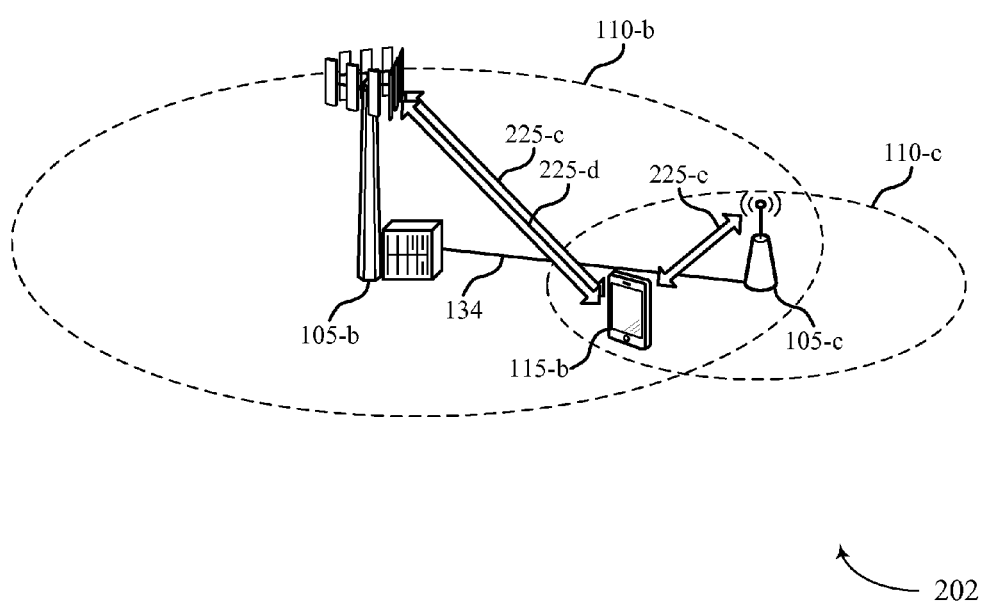
FIG. 2B illustrates an example of a wireless communication system for timing alignment procedures for dual PUCCH in accordance with various aspects of the present disclosure.

FIG. 2B illustrates an example of a wireless communication system 202 for timing alignment procedures for dual PUCCH in accordance with various aspects of the present disclosure. Wireless communication system 202 may illustrate aspects of the wireless communications system 100 of FIG. 1, and it may include a base station 105-*b* with coverage area 110-*b*, base station 105-*c* with coverage area 110-*c*, and a UE 115-*b*. Base station 105-*b* and base station 105-*c* may communicate with UE 115-*b* using a PCell 225-*c* and SCells 225-*d*, 225-*e*. In various embodiments, any SCell may be a PSCell, but for the sake of clarity, in this example SCell 225-*e* is a PSCell and SCell 225-*d* does not have PUCCH enabled. In some examples, more than two base stations 105 may support serving cells for UE 115-*b*.

PCell 225-*c* may be associated with the pTAG, SCell 225-*d* may be associated with an sTAG, and PSCell 225-*e* may be associated with a psTAG—e.g., because it has PUCCH enabled. In some cases, each TAG is associated with a different serving base station 105. PCell 225-*c* may be associated with a first PUCCH cell group, and PSCell 225-*e* may be associated with a second PUCCH cell group. SCell 225-*d* may be associated with either the first PUCCH cell group or the second PUCCH cell group. In some examples, additional serving cells in pTAG may be associated with the first PUCCH cell group. In some examples, additional serving cells in psTAG may be associated with the second PUCCH cell group. In some cases, additional serving cells in the sTAG are associated with the same PUCCH cell group as SCell 225-*d*, while in other examples additional serving cells in the sTAG are associated with a different PUCCH cell group from SCell 225-*d*. That is, pTAG may be associated with the first PUCCH cell group, psTAG may be associated with the second PUCCH cell group, and sTAG may be associated with either the first PUCCH cell group, the second PUCCH cell group, or both, since sTAG does not include a PUCCH-enabled cell. This associate of different TAGs with different cell groups may provide for a level of independence at the MAC layer between cells belonging to the different PUCCH groups.

According to aspects of the present disclosure, base station 105-*b* may configure the pTAG, psTAG, sTAG and a set of PUCCH cell groups for UE 115-*b*. If the time alignment timer for the any TAG expires, UE 115-*b* may determine which serving cells are associated with that TAG, and/or an associated PUCCH cell group, and perform a timing alignment procedure (as discussed below with reference to FIG. 4) for that subset of serving cells.

Figure 3A:
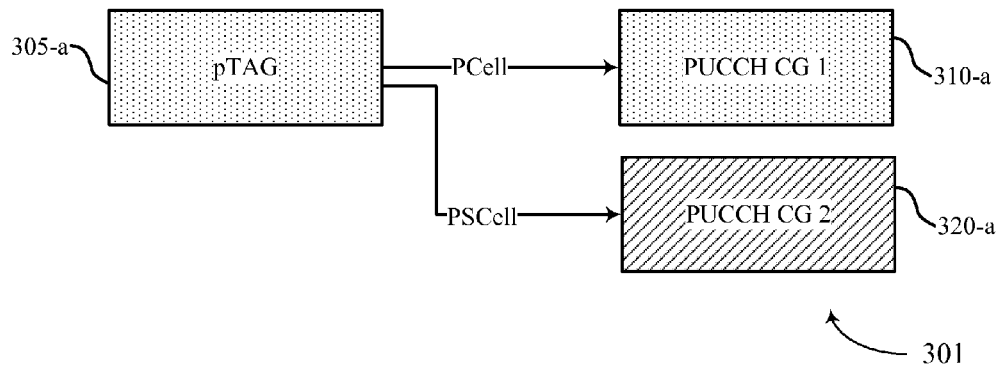
FIG. 3A illustrates an example of a timing alignment configuration for timing alignment procedures for dual PUCCH in accordance with various aspects of the present disclosure.

FIG. 3A illustrates an example of a timing alignment configuration 301 for timing alignment procedures for dual PUCCH in accordance with various aspects of the present disclosure. Timing alignment configuration 301 may illustrate an example configuration of wireless communication system 201 of FIG. 2A. Timing alignment configuration 301 may include a pTAG 305-*a*, which contains a PCell and an SCell. The PCell may be associated with a first PUCCH cell group 310-*a*, and the PSCell may be associated with a second PUCCH cell group 320-*a*.

According to aspects of the present disclosure, a base station 105 may configure the pTAG and the of PUCCH cell groups for a UE 115-*a* (FIG. 2A). If the time alignment timer for the pTAG expires, UE 115-*a* may determine which PUCCH enabled cells are in the pTAG and perform a timing alignment procedure for the associated PUCCH cell groups. For example, the RRC layer may be notified to release the PUCCH of both the PCell and the PSCell. That is, UE 115-*a* may perform a time alignment procedure for serving cells of PUCCH cell group 310-*a* and PUCCH cell group 320-*a* upon expiration of the time alignment timer for pTAG 305-*a*.

Figure 3B:
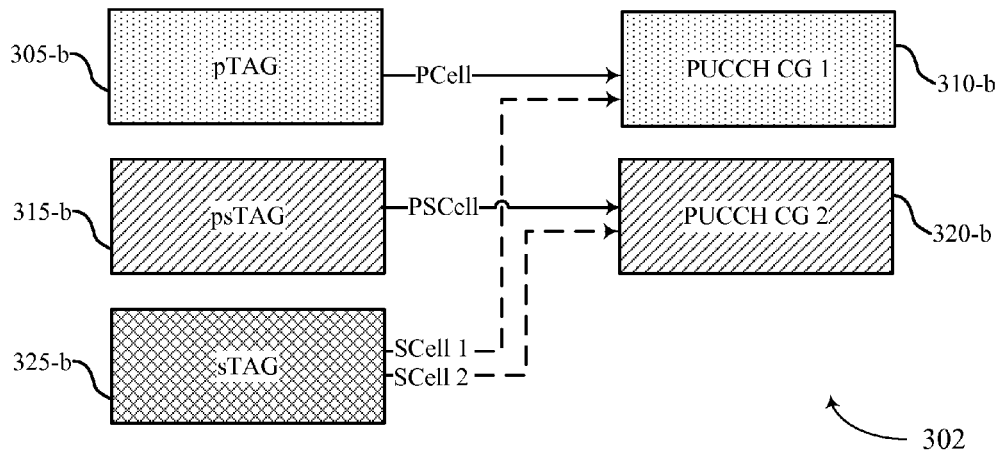
FIG. 3B illustrates an example of a timing alignment configuration for timing alignment procedures for dual PUCCH in accordance with various aspects of the present disclosure.

FIG. 3B illustrates an example of a timing alignment configuration 302 for timing alignment procedures for dual PUCCH in accordance with various aspects of the present disclosure. Timing alignment configuration 302 may illustrate an example configuration of wireless communication system 202 of FIG. 2B. Timing alignment configuration 302 may include a pTAG 305-*b* containing a PCell, psTAG 315-*b* containing a PSCell, and an sTAG 325-*b* containing one or more SCells. The PCell may be associated with a first PUCCH cell group 310-*b*, and the PSCell may be associated with a second PUCCH cell group 320-*b*. According to the example of timing alignment configuration 302, the SCells associated with sTAG 325-*b* may be associated with the first PUCCH cell group 310-*b* or the second PUCCH cell group 320-*b*, but, in this example, not both.

If a time alignment timer expires for pTAG 305-*b*, a UE 115-*b* (FIG. 2B) may notify the RRC layer to release the PUCCH of the PCell. The UE 115-*b* may then consider all time alignment timers expired for any other TAGs associated with the first PUCCH cell group 310-*b*. The UE 115 may perform a timing alignment procedure for all serving cells in TAGs with expired time alignment timers (or with timers considered expired). That is, UE 115-*b* may perform a time alignment procedure for serving cells of PUCCH cell group 310-*b* upon expiration of the time alignment timer for pTAG 305-*b*.

If the time alignment timer expires for psTAG 315-*b*, the UE 115-*b* may notify the RRC layer to release the PUCCH of the PSCell. The UE 115-*b* may then consider all time alignment timers expired for any other TAGs associated with the second PUCCH cell group 320-*b*. The UE 115-*b* may perform a timing alignment procedure for all serving cells in TAGs with expired (or considered-expired) time alignment timers. The UE 115-*b* may thus perform a time alignment procedure for serving cells of the PUCCH cell group 320-*b* upon expiration of the time alignment timer for psTAG 315-*b*; and the time alignment procedure for serving cells of PUCCH cell group 320-*b* may be performed without regard to the time alignment timer of pTAG 305-*b*.

If the time alignment timer expires for sTAG 325-*b*, the UE 115 may perform a timing alignment procedure for all serving cells in sTAG 325-*b*. In some examples, the timing alignment procedure for a TAG including only non-PUCCH enabled cells may be different from the timing alignment procedure for a TAG that includes a PUCCH-enabled cell. For example, the timing alignment procedure for a TAG with a PUCCH-enabled cell may include clearing DL assignments and UL grants, whereas a timing alignment procedure for a TAG without a PUCCH-enabled cell may not include these steps.

Figure 3C:
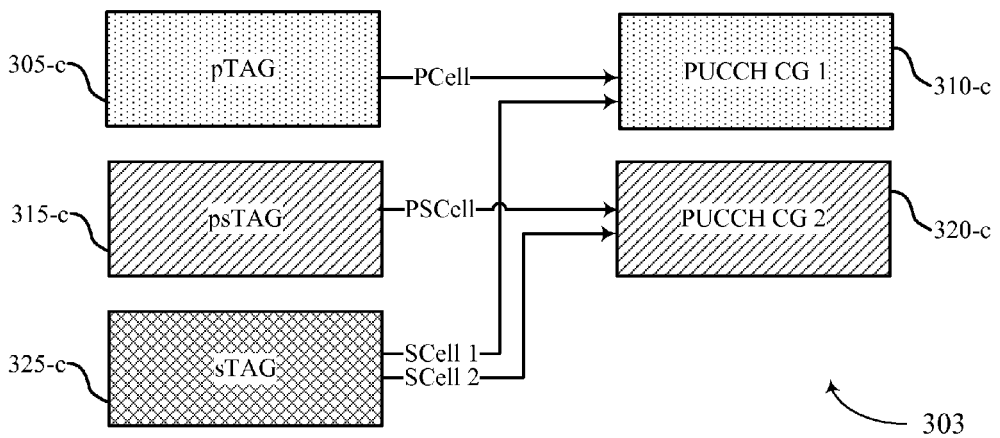
FIG. 3C illustrates an example of a timing alignment configuration for timing alignment procedures for dual PUCCH in accordance with various aspects of the present disclosure.

FIG. 3C illustrates an example of a timing alignment configuration 303 for timing alignment procedures for dual PUCCH in accordance with various aspects of the present disclosure. Timing alignment configuration 303 may illustrate an example configuration of wireless communication system 202 of FIG. 2B. Timing alignment configuration 303 may include a pTAG 305-c containing a PCell, psTAG 315-c containing a PSCell, and an sTAG 325-c containing one or more SCells. The PCell may be associated with a first PUCCH cell group 310-c, and the PSCell may be associated with a second PUCCH cell group 320-c. According to the example of timing alignment configuration 303, the SCells associated with sTAG 325-c may be associated with the first PUCCH cell group 310-b, the second PUCCH cell group 320-b, or both. The UE 115-b may thus perform a timing alignment procedure some cells of sTAG 325-c (e.g., those associated with PUCCH cell group 310-b) upon expiration of a time alignment timer associated with pTAG 305-b; or UE 115-b may perform a timing alignment procedure for other cells of sTAG 325-b (e.g., those associated with PUCCH cell group 320-b) upon expiration of a time alignment timer associated with psTAG 315-b.

If a time alignment timer expires for pTAG 305-c, a UE 115-b (FIG. 2B) may notify the RRC layer to release the PUCCH of the PCell. The UE 115-b may perform a timing alignment procedure for all serving cells in pTAG 305-c or the first PUCCH cell group 310-c.

If the time alignment timer expires for psTAG 315-c, a UE 115-b may notify the RRC layer to release the PSCell PUCCH. The UE 115 may perform a timing alignment procedure for all serving cells in psTAG 315-c or PUCCH cell group 320-c.

If the time alignment timer expires for sTAG 325-c, the UE 115-b may perform a timing alignment procedure for all serving cells in sTAG 325-c. In some examples, the timing alignment procedure for a TAG without a PUCCH-enabled cell may be different from the timing alignment procedure for a TAG with a PUCCH-enabled cell.

In some cases, a UE 115-b may be associated with more than three TAGs and more than two PUCCH cell groups. There may be one pTAG, but there may be more than one sTAG or psTAG. In these cases, the cells of each sTAG may all be associated with the same PUCCH cell group as in FIG. 3B or with different PUCCH cell groups as in FIG. 3C.

Figure 4:
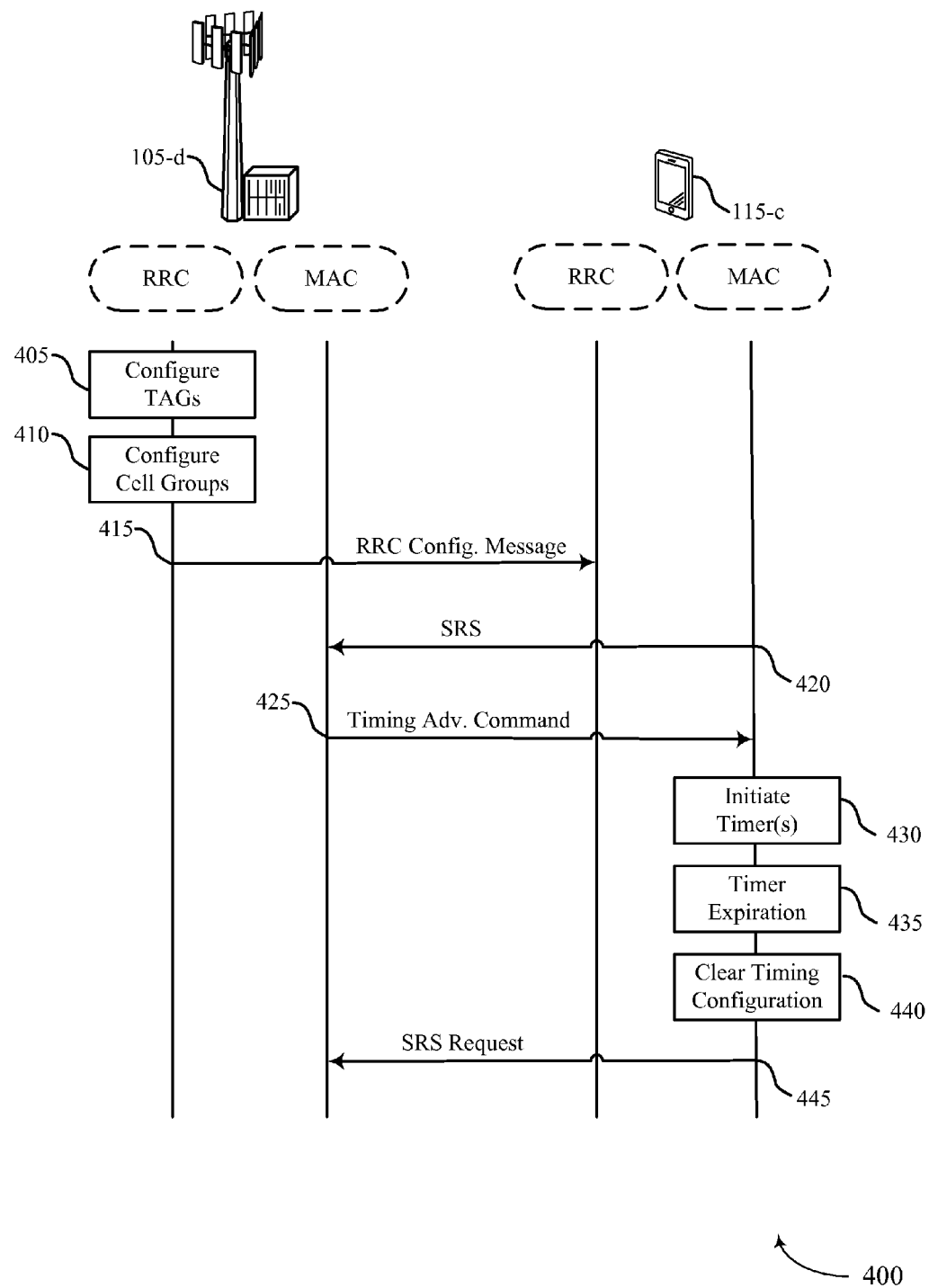
FIG. 4 illustrates an example of a process diagram for timing alignment procedures for dual PUCCH in accordance with various aspects of the present disclosure.

FIG. 4 illustrates an example of a process diagram 400 for timing alignment procedures with dual PUCCH in accordance with various aspects of the present disclosure. Process diagram 400 may include communication between a base station 105-d, which may be a primary serving base station for a UE 115-c. The communication between base station 105-d and UE 115-c may occur via an RRC layer and a MAC layer. Process diagram 400 may illustrate timing alignment procedures described above with reference to the preceding figures.

At step 405, base station 105-d may configure a set of TAGs for a UE. For example, base station 105-d may configure a pTAG, a psTAG, and/or an sTAG.

At step 410, base station 105-d may configure a set of PUCCH cell groups for the UE, including a first PUCCH cell group and a second PUCCH cell group. Base station 105-d may then associate a first set of serving cells of the pTAG with the first PUCCH cell group. Base station 105-d may associate a second set of serving cells of the pTAG with the second PUCCH cell group. In some examples (e.g., in carrier aggregation) the first PUCCH cell group and the second PUCCH cell group both consist of serving cells for the UE 115-c. Serving cells of an sTAG may be in either the first PUCCH cell group or the second PUCCH cell group as described above with reference to FIGS. 2B and 2C. In some examples, the association between TAGs and PUCCH cell groups is asymmetric. That is, the number of TAGs may not be the same as the number of PUCCH cell groups and there may not be a one-to-one mapping between TAGs and PUCCH cell groups. However, both the set of TAGs and the set of PUCCH cell groups may both consist of serving cells (or component carriers) for UE 115-c, and each serving cell may be in one TAG and in one PUCCH cell group.

Base station 105-d may send an RRC configuration message, at step 415, to UE 115-c. This may enable UE 115-c to identify the set of TAGs, the set of PUCCH cell groups, and the association between the TAGs and PUCCH cell groups.

In some cases UE 115-c may transmit one or more SRS's 420 to enable base station 105-d to establish a timing offset. In some cases, UE 115-c may transmit an SRS to more than one base station 105 associated with different TAGs.

Base station 105-d may send a timing advance command, at step 425, to UE 115-c to establish a timing alignment for a TAG (e.g., a pTAG). In some cases, base station 105-d transmits more than one timing advance command for multiple TAGs at step 2. In other cases, a different base station 105 (not shown) may also transmit a timing advance command to UE 115-c for a different TAG (e.g., a psTAG or an sTAG).

At step 430, UE 115-c may initiate a time alignment timer base on receiving the timing advance command at step 425. In some cases, UE 115-c initiates a time alignment timer for each TAG in the set of TAGs. In some cases, the timing advance command may be an indication to UE 115-c to initiate the timer. Thus, base station 105-d may be considered to initiate the time alignment timer for one or more TAGs (e.g., pTAG, sTAG, and/or psTAG).

At step 435, UE 115-c may determine that a time alignment timer has expired for one or more TAGs. Then, at step 440, UE 115-c may perform a timing alignment procedure for serving cells of the first or second PUCCH cell groups based on the expiration of the time alignment timer. The UE 115-c may determine the timing alignment procedure based on an association between the set of TAGs and the set of PUCCH cell groups as described above with reference to FIGS. 3A, 3B, and 3C. For example, UE 115-c may determine a subset of serving cells for which to perform MAC layer procedures as described above. In some examples, the timing alignment procedure includes notifying an RRC control to release a PUCCH in a PUCCH-enabled cell, notifying the RRC control entity to release an SRS, flushing a HARQ buffer for a serving cell, clearing a DL assignment for a serving cell, and/or clearing an UL grant for a serving cell.

At step 445, UE 115-c may transmit an SRS request to obtain a resource for transmitting an SRS. The SRS may then enable the base station 105-d to determine a new timing offset (e.g., if UE 115-c has moved and the propagation delay has changed). Base station 105-d may then transmit a new timing advance command associated with a TAG, and repeat the process described above from step 425.

Figure 5:
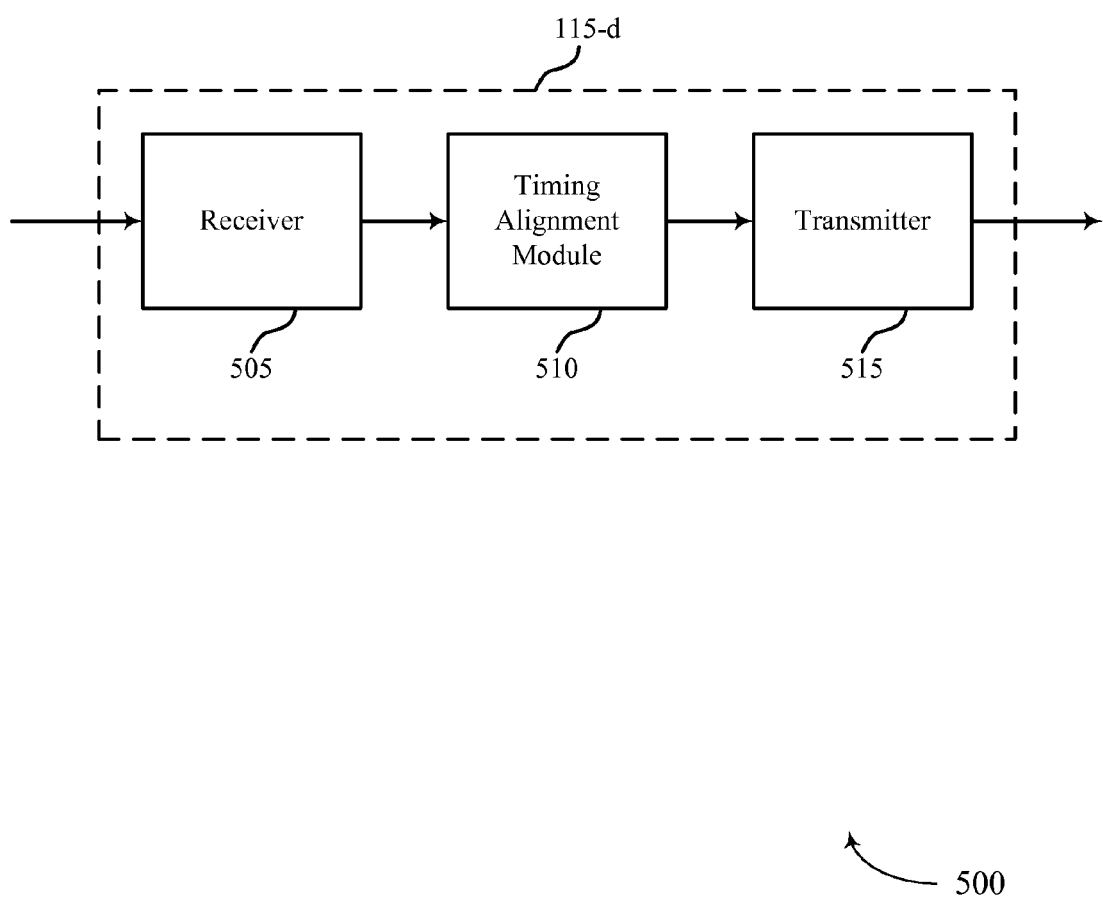
FIG. 5 shows a block diagram of a device for timing alignment procedures for dual PUCCH in accordance with various aspects of the present disclosure.

FIG. 5 shows a block diagram 500 of a UE 115-d for timing alignment procedures for dual PUCCH in accordance with various aspects of the present disclosure. The UE 115-d may be an example of aspects of a UE 115 described with reference to FIGS. 1-4. The UE 115-d may include a receiver 505, a timing alignment module 510, and/or a transmitter

515. The UE 115-*d* may also include a processor. Each of these components may be in communication with one another.

The components of the UE 115-*d* may, individually or collectively, be implemented with at least one application specific integrated circuits (ASIC) adapted to perform some or all of the applicable functions in hardware. Alternatively, the functions may be performed by one or more other processing units (or cores), on one or more ICs. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors. In some embodiments, the components can be executed in a dedicated hardware (e.g., a circuit or circuitry) for performing the functions described herein.

The receiver 505 may receive information such as packets, user data, and/or control information associated with various information channels (e.g., control channels, data channels, timing advance commands, etc.). Information may be passed on to the timing alignment module 510, and to other components of the UE 115-*d*.

The timing alignment module 510 may identify a set of TAGs, and identify a set of PUCCH cell groups comprising a first PUCCH cell group and a second PUCCH cell group. The timing alignment module 510 may determine a timing alignment procedure based on an association between the set of TAGs and the set of PUCCH cell groups.

The transmitter 515 may transmit signals received from other components of the UE 115-*d* (e.g., PUCCH, SRS, or a request to release resources for SRS). In some embodiments, the transmitter 515 is collocated with the receiver 505 in a transceiver(s). The transmitter 515 may include a single antenna, or it may include a plurality of antennas.

Figure 6:
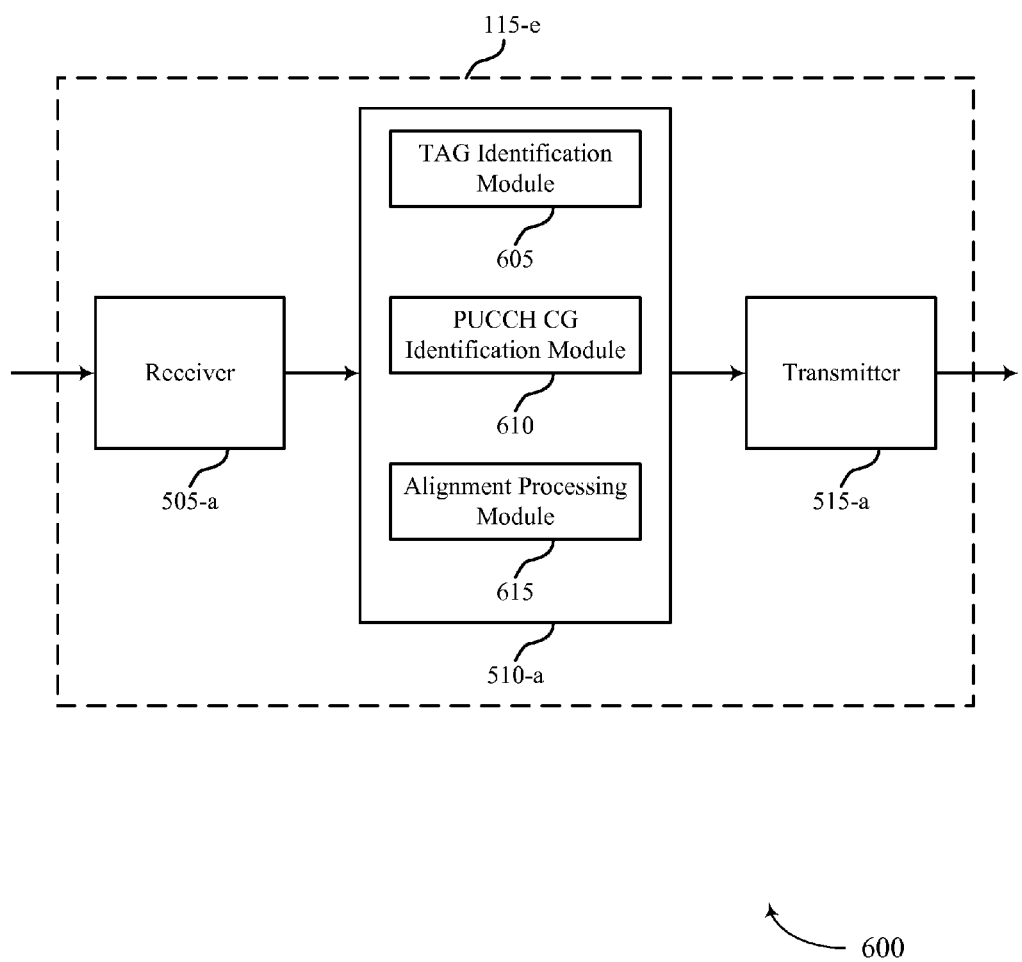
FIG. 6 shows a block diagram of a device for timing alignment procedures for dual PUCCH in accordance with various aspects of the present disclosure.

FIG. 6 shows a block diagram 600 of a UE 115-*e* for timing alignment procedures for dual PUCCH in accordance with various aspects of the present disclosure. The UE 115-*e* may be an example of aspects of a UE 115 described with reference to FIGS. 1-5. The UE 115-*e* may include a receiver 505-*a*, a timing alignment module 510-*a*, and/or a transmitter 515-*a*. The UE 115-*e* may also include a processor. Each of these components may be in communication with one another. The timing alignment module 510-*a* may also include a TAG identification module 605, a PUCCH CG identification module 610, and an alignment processing module 615.

The components of the UE 115-*e* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors. In some embodiments, the modules can be executed in a dedicated hardware (e.g., a circuit or circuitry) for performing the functions described herein.

The receiver 505-*a* may receive information which may be passed on to the timing alignment module 510-*a*, and to other components of the UE 115-*e*. The timing alignment module 510-*a* may perform the operations described above with reference to FIG. 5. The transmitter 515-*a* may transmit signals received from other components of the UE 115-*e*.

The TAG identification module 605 may identify a set of TAGs as described above with reference to FIGS. 2-4. In some examples, the set of TAGs consists of the pTAG. In some examples, the set of TAGs includes the pTAG and the psTAG. In other cases, the set of TAGs includes an sTAG.

The PUCCH CG identification module 610 may identify a set of PUCCH cell groups comprising a first PUCCH cell group and a second PUCCH cell group as described above with reference to FIGS. 2-4. In some examples, the first PUCCH cell group may be a set of serving cells comprising a PCell. In some examples, the second PUCCH cell group may be a set of serving cells comprising a PUCCH-enabled secondary cell (PSCell).

The alignment processing module 615 may determine a timing alignment procedure based on an association between the set of TAGs and the set of PUCCH cell groups as described above with reference to FIGS. 2-4. The alignment processing module 615 may also perform the timing alignment procedure for serving cells of at least one of the first or second PUCCH cell groups upon expiration of the time alignment timer as described above with reference to FIGS. 2-4. In some examples, the timing alignment procedure includes at least one of notifying an RRC control to release a PUCCH in a PUCCH-enabled cell, notifying the RRC control entity to release an SRS, flushing a HARQ buffer for a serving cell, clearing a DL assignment for a serving cell, or clearing an UL grant for a serving cell.

Figure 7:
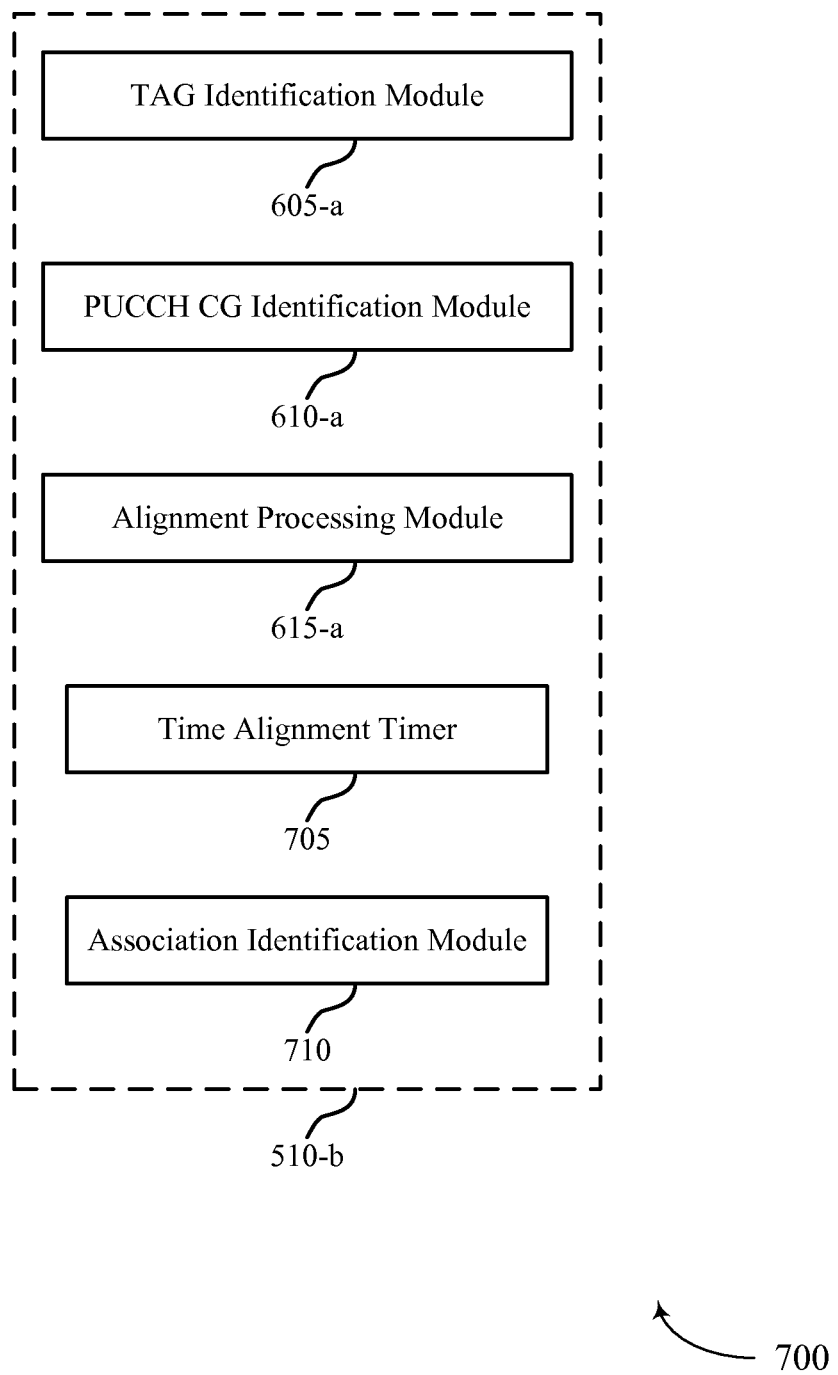
FIG. 7 shows a block diagram of a device for timing alignment procedures for dual PUCCH in accordance with various aspects of the present disclosure.

FIG. 7 shows a block diagram 700 of a timing alignment module 510-*b* for timing alignment procedures for dual PUCCH in accordance with various aspects of the present disclosure. The timing alignment module 510-*b* may be an example of aspects of a timing alignment module 510 described with reference to FIGS. 5-7. The timing alignment module 510-*b* may include a TAG identification module 605-*a*, a PUCCH CG identification module 610-*a*, and an alignment processing module 615-*a*. Each of these modules may perform the functions described above with reference to FIG. 7. The timing alignment module 510-*b* may also include a time alignment timer 705, and an association identification module 710.

The components of the timing alignment module 510-*b* may, individually or collectively, be implemented with at least one ASIC adapted to perform some or all of the applicable functions in hardware. Alternatively, the functions may be performed by one or more other processing units (or cores), on an IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors. In some embodiments, the modules can be executed in a dedicated hardware (e.g., a circuit or circuitry) for performing the functions described herein.

The time alignment timer 705 may initiate a time alignment timer for each TAG of the set of TAGs as described above with reference to FIGS. 2-4. For example, time alignment timer 705 may initiate a time alignment timer in response to a timing advance command.

The association identification module 710 may identify an association between the first and second PUCCH cell groups and set of TAGs as described above with reference to FIGS. 2-4. The association identification module 710 may identify an association between a pTAG and the first PUCCH cell group as described above with reference to FIGS. 2-4. The association identification module 710 may also identify an association between a psTAG and the second PUCCH cell group as described above with reference to FIGS. 2-4. In some cases, the association identification module 710 may identify an association between a sTAG and either the first or second PUCCH cell groups as described above with reference to FIGS. 2-4. In other examples, the association identification module 710 may also identify an association between a first serving cell of an sTAG and the first PUCCH cell group as described above with reference to FIGS. 2-4. In still other cases, the association identification module 710 may identify an association between a second serving cell of the sTAG and the second PUCCH cell group as described above with reference to FIGS. 2-4. The association between the set of TAGs and the set of PUCCH cell groups may be asymmetric—e.g., there may be no one-to-one correspondence between the sets.

Figure 8:
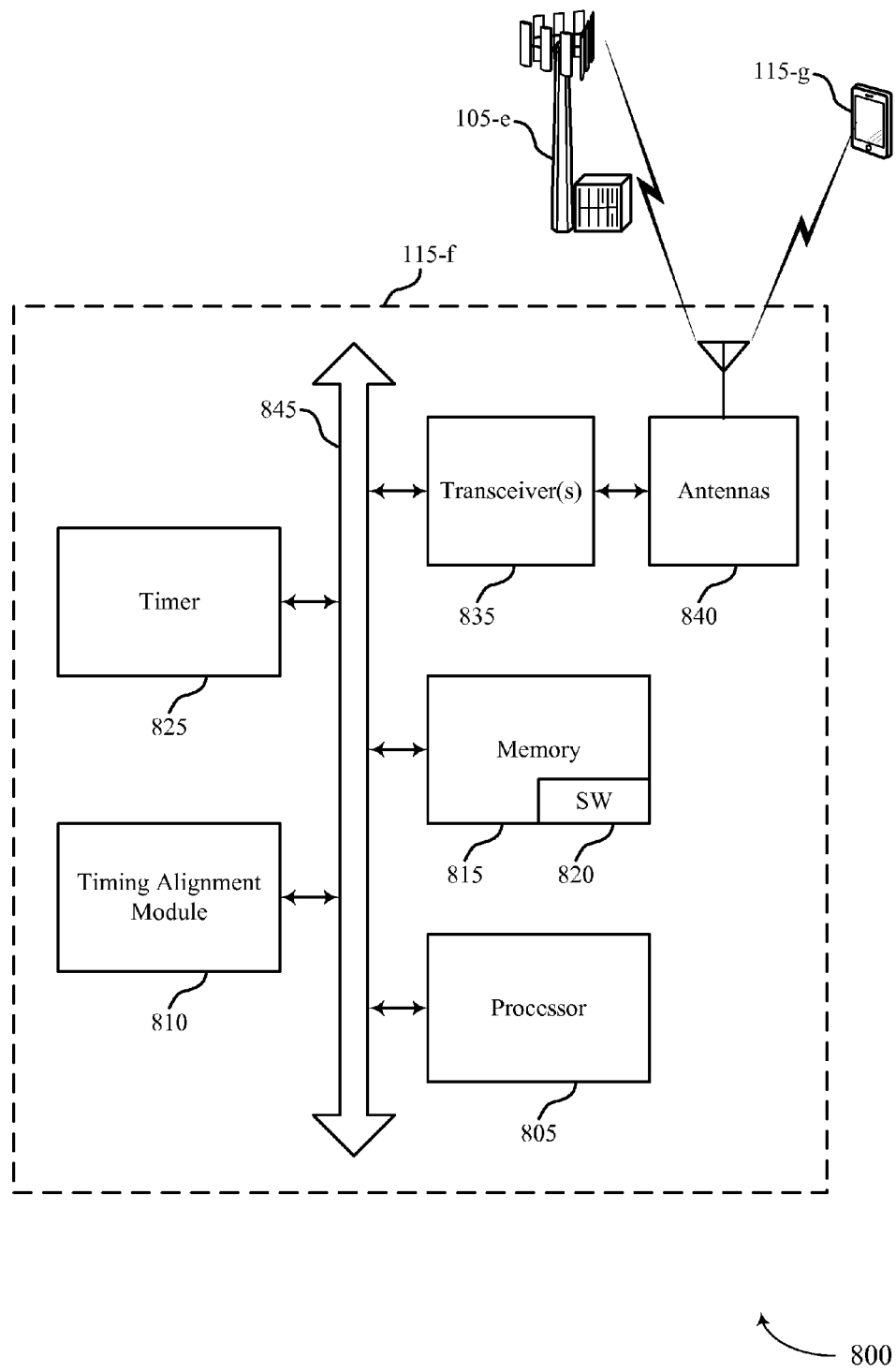
FIG. 8 illustrates a block diagram of a system for timing alignment procedures for dual PUCCH in accordance with various aspects of the present disclosure.

FIG. 8 shows a diagram of a system 800 for timing alignment procedures for dual PUCCH in accordance with various aspects of the present disclosure. System 800 may include a UE 115-*f*, which may be an example of a UE 115 described with reference to FIGS. 1-7. The UE 115-*f* may include a timing alignment module 810, which may be an example of a timing alignment module described with reference to FIGS. 5-7. The UE 115-*f* may also include a timer 825. In some examples, the UE 115-*f* includes components for bi-directional voice and data communications, including components for transmitting communications and components for receiving communications. For example, UE 115-*f* may be in communication with a base station 105-*e* or with another UE 115-*g*.

Timer 825 may be configured to keep accurate measurements of time for UE 115-*f*. This may enable UE 115-*f* to synchronize transmissions with one or more TAGs based on timing advance commands. Timer 825 may also be configured to determine when a time alignment timer interval has expired. In some examples, the timer 825 is the MAC control element (CE) timeAlignmentTimer.

The UE 115-*f* may also include a processor 805, and memory 815 (including software (SW)) 820, a transceiver(s) 835, and one or more antenna(s) 840, which each may communicate, directly or indirectly, with each other (e.g., via buses 845. The transceiver(s) 835 may communicate bi-directionally, via the antenna(s) 840 and/or wired or wireless links, with one or more networks, as described above. For example, the transceiver(s) 835 may communicate bi-directionally with a base station 105. The transceiver(s) 835 may include a modem to modulate packets and provide the modulated packets to the antenna(s) 840 for transmission, and to demodulate packets received from the antenna(s) 840. While the UE 115-*f* may include a single antenna, the UE 115-*f* may also have multiple antennas capable of concurrently transmitting and/or receiving multiple wireless transmissions. The transceiver(s) 835 may also be capable of concurrently communicating with one or more base stations 105.

The memory 815 may include random access memory (RAM) and read only memory (ROM). The memory 815 may store computer-readable, computer-executable software/firmware code 820 including instructions that, when executed, cause the processor 805 to perform various functions described herein (e.g., timing alignment procedures for dual PUCCH, etc.). Alternatively, the software/firmware code 820 may not be directly executable by the processor 805 but cause a computer (e.g., when compiled and executed) to perform functions described herein. The processor 805 may include an intelligent hardware device, e.g., a central processing unit (CPU), a microcontroller, an ASIC, etc. In some embodiments, the modules can be executed in a dedicated hardware (e.g., a circuit or circuitry) for performing the functions described herein.

Figure 9:
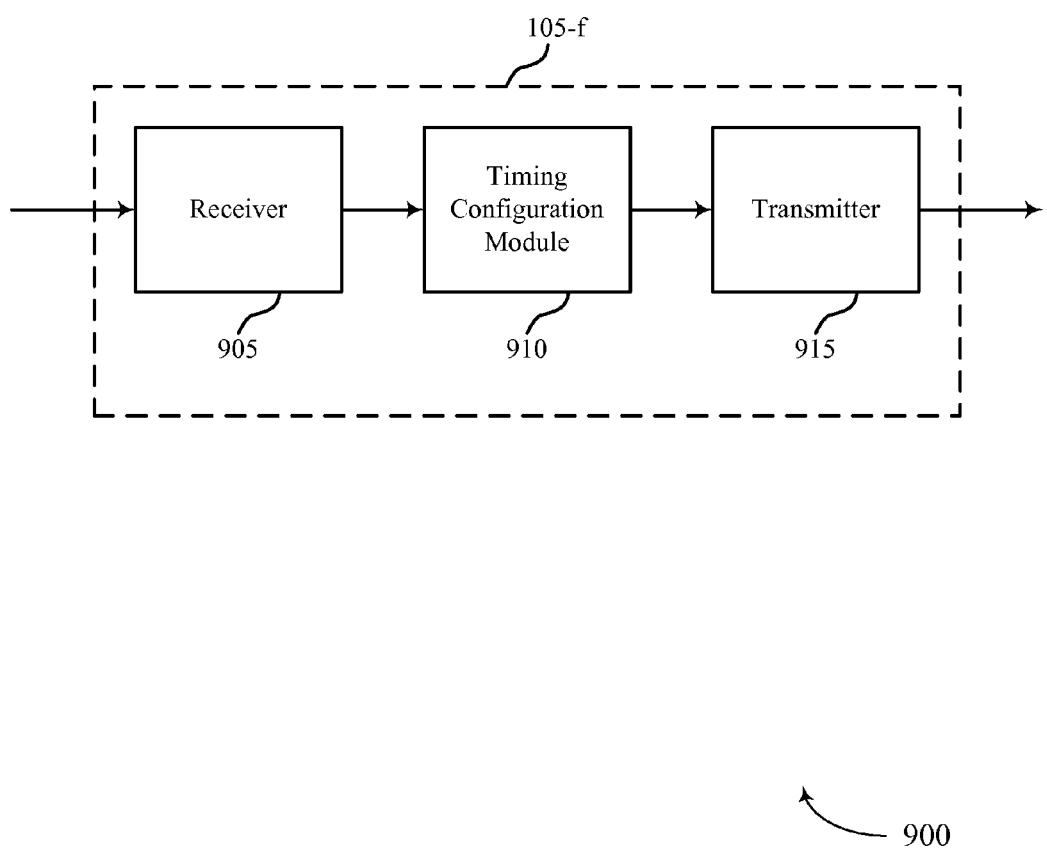
FIG. 9 shows a block diagram of a device for timing alignment procedures for dual PUCCH in accordance with various aspects of the present disclosure.

FIG. 9 shows a block diagram 900 of a base station 105-*f* for timing alignment procedures for dual PUCCH in accordance with various aspects of the present disclosure. The base station 105-*f* may be an example of aspects of a base station 105 described with reference to FIGS. 1-4. The base station 105-*f* may include a receiver 905, a timing configuration module 910, and/or a transmitter 915. The base station 105-*f* may also include a processor. Each of these components may be in communication with one another.

The components of the base station 105-*f* may, individually or collectively, be implemented with at least one ASIC adapted to perform some or all of the applicable functions in hardware. Alternatively, the functions may be performed by one or more other processing units (or cores), on an IC or ICs. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors. In some embodiments, the components can be executed in a dedicated hardware (e.g., a circuit or circuitry) for performing the functions described herein.

The receiver 905 may receive information such as packets, user data, and/or control information associated with various information channels (e.g., control channels, data channels, PUCCH transmissions, SRS, etc.). Information may be passed on to the timing configuration module 910, and to other components of the base station 105-*f*.

The timing configuration module 910 may configure a primary timing adjustment group (pTAG) for a UE. The timing configuration module 910 may configure a set of PUCCH cell groups for the UE, the set of PUCCH cell groups comprising a first PUCCH cell group and a second PUCCH cell group. The timing configuration module 910 may associate a first set of serving cells of the pTAG with the first PUCCH cell group.

The transmitter 915 may transmit signals received from other components of the base station 105-*f*, such as RRC configuration messages and timing advance commands. In some embodiments, the transmitter 915 may be collocated with the receiver 905 in a transceiver(s). The transmitter 915 may include a single antenna, or it may include a plurality of antennas.

Figure 10:
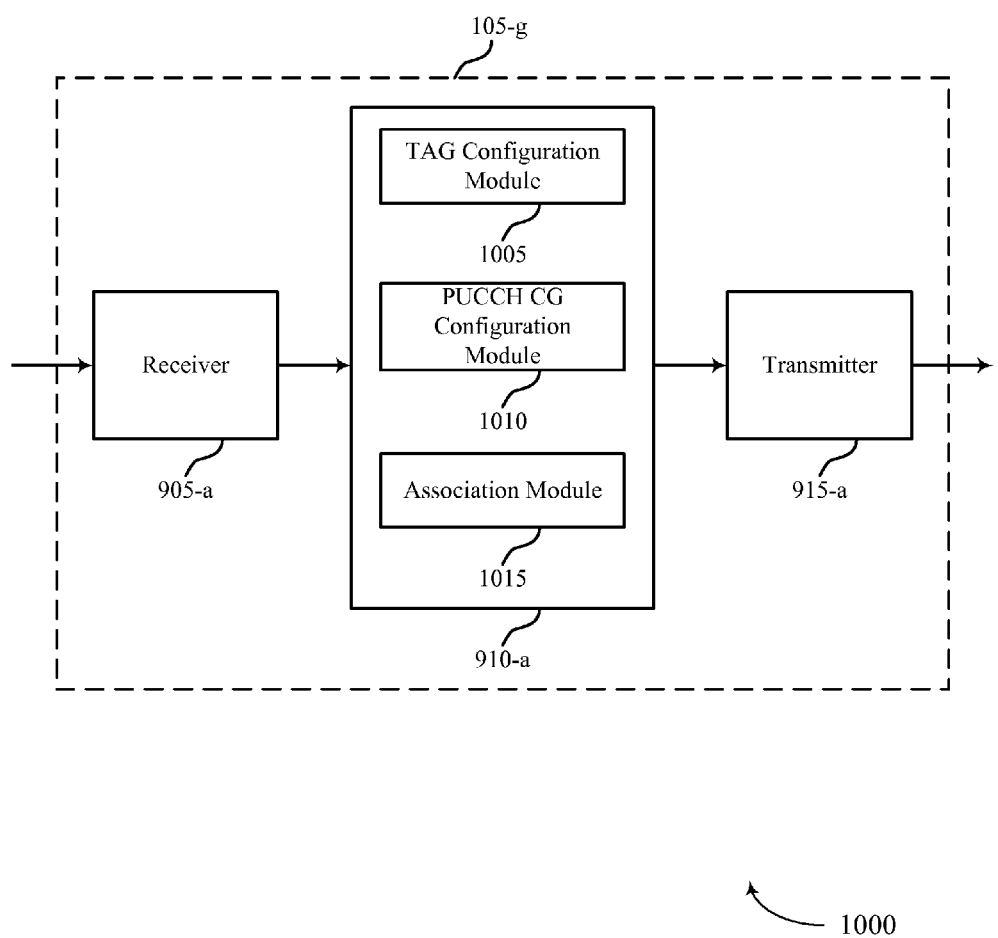
FIG. 10 shows a block diagram of a device for timing alignment procedures for dual PUCCH in accordance with various aspects of the present disclosure.

FIG. 10 shows a block diagram 1000 of a base station 105-*g* for timing alignment procedures for dual PUCCH in accordance with various aspects of the present disclosure. The base station 105-*g* may be an example of aspects of a base station 105 described with reference to FIGS. 1-4, and 8. The base station 105-*g* may include a receiver 905-*a*, a timing configuration module 910-*a*, and/or a transmitter 915-*a*. The base station 105-*g* may also include a processor. Each of these components may be in communication with one another. The timing configuration module 910-*a* may also include a TAG configuration module 1005, a PUCCH CG configuration module 1010, and an association module 1015.

The components of the base station 105-*g* may, individually or collectively, be implemented with at least one ASIC adapted to perform some or all of the applicable functions in hardware. Alternatively, the functions may be performed by one or more other processing units (or cores), an IC or ICs. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors. In some embodiments, the modules can be executed in a dedicated hardware (e.g., a circuit or circuitry) for performing the functions described herein.

The receiver 905-a may receive information which may be passed on to the timing configuration module 910-a, and to other components of the base station 105-g. The timing configuration module 910-a may perform the operations described above with reference to FIG. 9. The transmitter 915-a may transmit signals received from other components of the base station 105-g.

The TAG configuration module 1005 may configure a primary timing adjustment group (pTAG) for a UE as described above with reference to FIGS. 2-4. The TAG configuration module 1005 may also configure a psTAG for the UE as described above with reference to FIGS. 2-4. The TAG configuration module 1005 may, in some examples, associate the psTAG with the second PUCCH cell group, as described above with reference to FIGS. 2-4. Additionally or alternatively, the TAG configuration module 1005 may configure an sTAG for the UE, as described above with reference to FIGS. 2-4. In some cases, the TAG configuration module 1005 configures an sTAG for the UE, as described above with reference to FIGS. 2-4.

The PUCCH CG configuration module 1010 may configure a set of PUCCH cell groups for the UE, including a first PUCCH cell group and/or a second PUCCH cell group, as described above with reference to FIGS. 2-4. In some examples, the first PUCCH cell group and the second PUCCH cell group include serving cells for the UE. In some cases, the first PUCCH cell group may be a set of serving cells comprising a PCell, while the second PUCCH cell group may be a set of serving cells comprising a PSCell.

The association module 1015 may associate a first set of serving cells of the pTAG with the first PUCCH cell group as described above with reference to FIGS. 2-4. The association module 1015 may also associate a second set of serving cells of the pTAG with the second PUCCH cell group as described above with reference to FIGS. 2-4. The association module 1015 may also associate the sTAG with either the first or second PUCCH cell groups as described above with reference to FIGS. 2-4. Additionally or alternatively, the association module 1015 may associate a first set of serving cells of the sTAG with the first PUCCH cell group, as described above with reference to FIGS. 2-4. In some examples, the association module 1015 may also associate a second set of serving cells of the sTAG with the second PUCCH cell group, as described above with reference to FIGS. 2-4.

Figure 11:
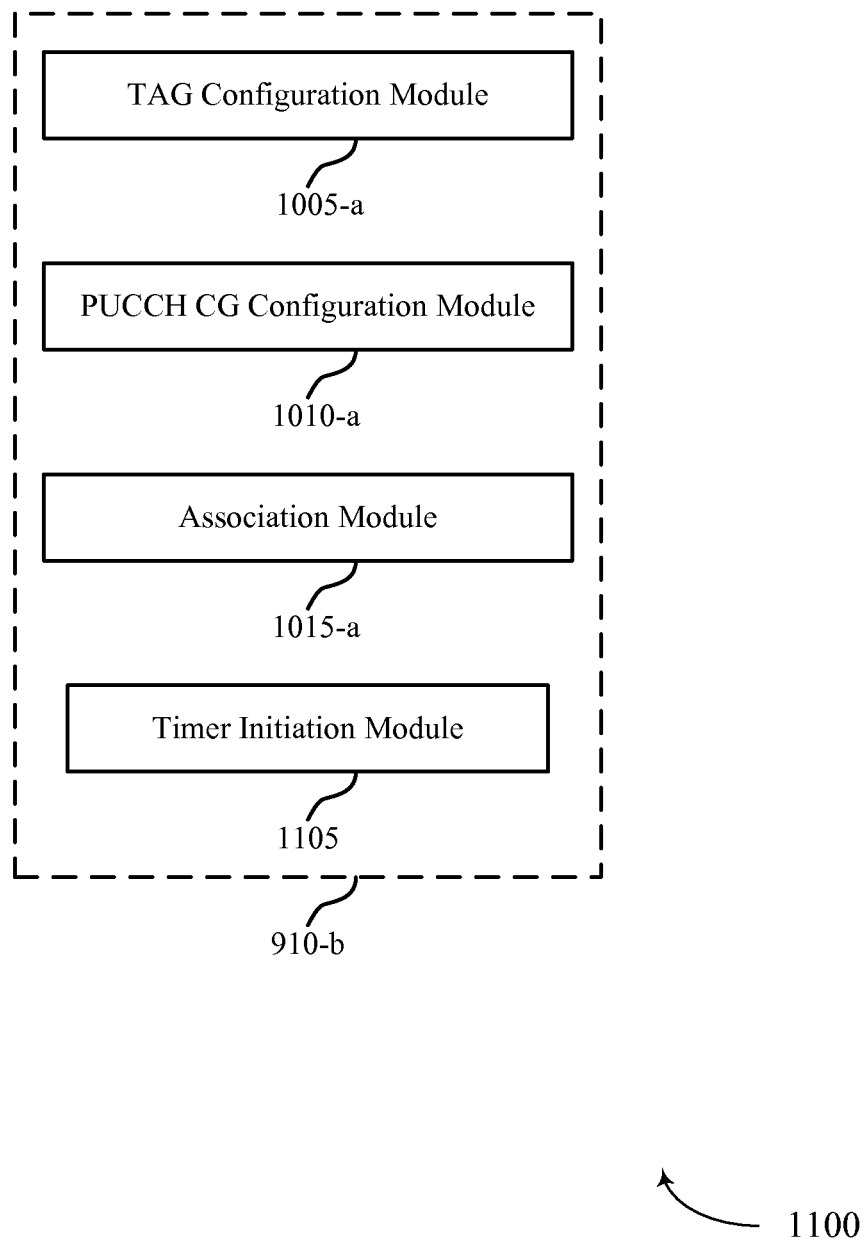
FIG. 11 shows a block diagram of a device for timing alignment procedures for dual PUCCH in accordance with various aspects of the present disclosure.

FIG. 11 shows a block diagram 1100 of a timing configuration module 910-b for timing alignment procedures for dual PUCCH in accordance with various aspects of the present disclosure. The timing configuration module 910-b may be an example of aspects of a timing configuration module 910 described with reference to FIGS. 9-11. The timing configuration module 910-b may include a TAG configuration module 1005-a, a PUCCH CG configuration module 1010-a, and an association module 1015-a. Each of these modules may perform the functions described above with reference to FIG. 11. The timing configuration module 910-b may also include and a timer initiation module 1105.

The components of the timing configuration module 910-b may, individually or collectively, be implemented with at least one ASIC adapted to perform some or all of the applicable functions in hardware. Alternatively, the functions may be performed by one or more other processing units (or cores), on one or more ICs. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors. In some embodiments, the modules can be executed in a dedicated hardware (e.g., a circuit or circuitry) for performing the functions described herein.

The timer initiation module 1105 may initiate a time alignment timer for the pTAG and a PUCCH secondary TAG (psTAG), as described above with reference to FIGS. 2-4. The timer initiation module 1105 may also initiate a time alignment timer for a secondary TAG (sTAG), as described above with reference to FIGS. 2-4.

Figure 12:
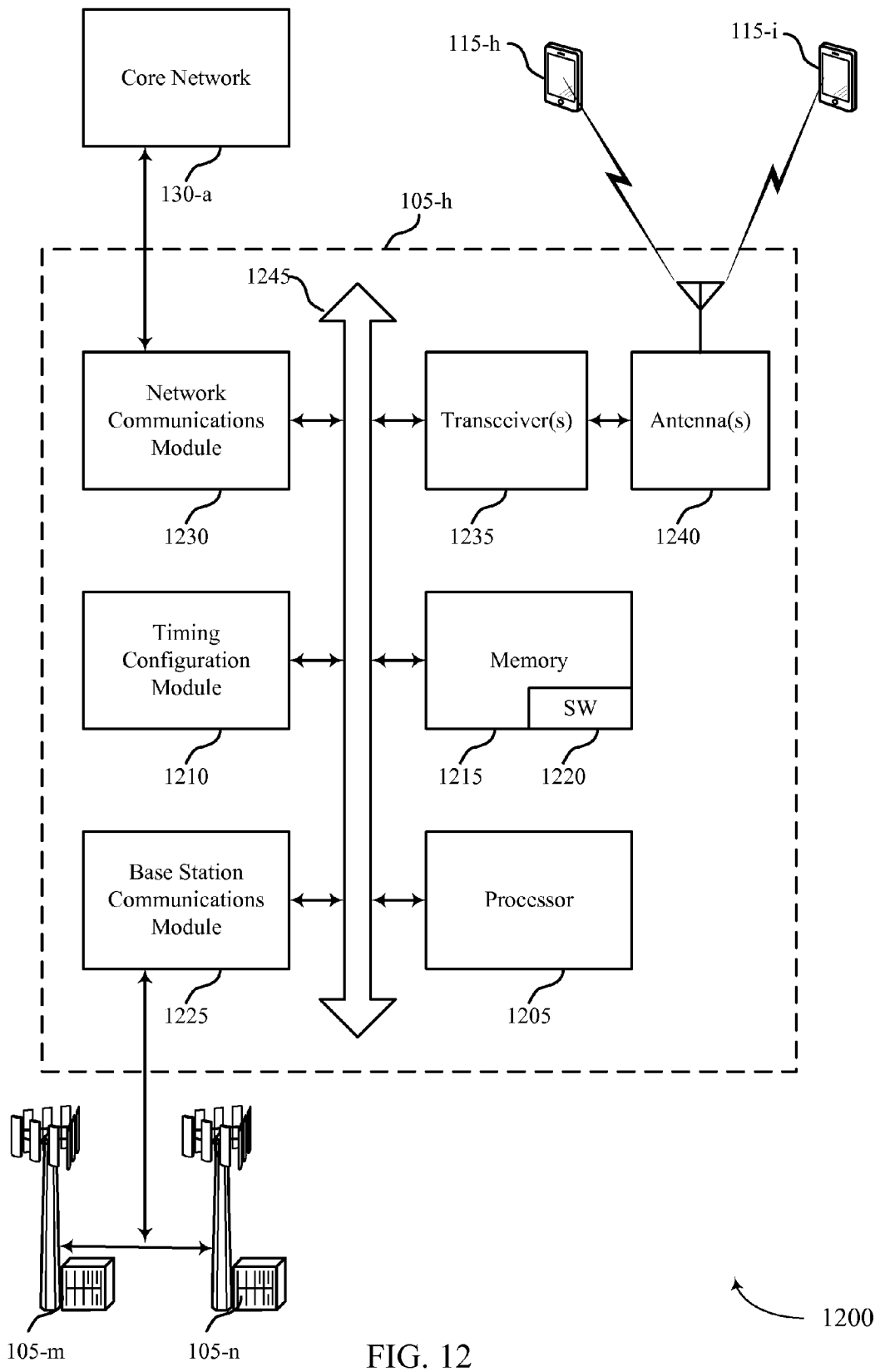
FIG. 12 illustrates a block diagram of a system for timing alignment procedures for dual PUCCH in accordance with various aspects of the present disclosure.

FIG. 12 shows a diagram of a system 1200 for timing alignment procedures for dual PUCCH in accordance with various aspects of the present disclosure. System 1200 may include a base station 105-h, which may be an example of a base station 105 described with reference to FIGS. 1-4, and 9-11. The base station 105-h may include a timing configuration module 1210, which may be an example of a timing configuration module 910 described with reference to FIGS. 9-11. The base station 105-h may also include a base station communication module 1225. In some examples, the base station 105-h includes components for bi-directional voice and data communications, including components for transmitting communications and components for receiving communications. For example, base station 105-h may communication with UEs 115-h and 115-i.

In some cases, the base station 105-h has one or more wired backhaul links. The base station 105-h may have a wired backhaul link (e.g., S1 interface, etc.) to the core network 130. The base station 105-h may also communicate with other base stations 105, such as base station 105-m and base station 105-n via inter-base station communication links (e.g., X2 interface, etc.). Each of the base stations 105 may communicate with UEs 115 using the same or different wireless communications technologies. In some cases, base station 105-h may communicate with other base stations such as 105-m and/or 105-n utilizing base station communication module 1225. In some embodiments, base station communication module 1225 may provide an X2 interface within an LTE/LTE-A wireless communication network technology to provide communication between some of the base stations 105. In some cases, base station 105-h communicates with other base stations through core network 130. Additionally or alternatively, base station 105-h may communicate with the core network 130-a through network communications module 1230.

The base station 105-h may include, a processor 1205, memory 1215 (including software (SW)1220), transceiver(s) 1235, and antenna(s) 1240, which each may be in communication, directly or indirectly, with one another (e.g., over bus system 1245). The transceiver(s) 1235 may be configured to communicate bi-directionally, via the antenna(s) 1240, with the UEs 115, which may be multi-mode devices. The transceiver(s) 1230 (and/or other components of the base station 105-h) may also be configured to communicate bi-directionally, via the antenna(s) 1240, with one or more other base stations (not shown). The transceiver(s) 1235 may include a modem configured to modulate packets and provide the modulated packets to the antennas 1240 for transmission, and to demodulate packets received from the antennas 1240. The base station 105-*h* may include multiple transceivers, each with one or more associated antennas 1240. The transceiver(s) may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., configuring TAGs, configuring PUCCH cell groups, associating TAGs and PUCCH cell groups, etc.). Alternatively, the software code 1220 may not be directly executable by the processor 1205 but be configured to cause the computer, e.g., when compiled and executed, to perform functions described herein.

The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processors (DSPs), and the like. In some embodiments, the modules can be executed in a dedicated hardware (e.g., a circuit or circuitry) for performing the functions described herein.

Figure 13:
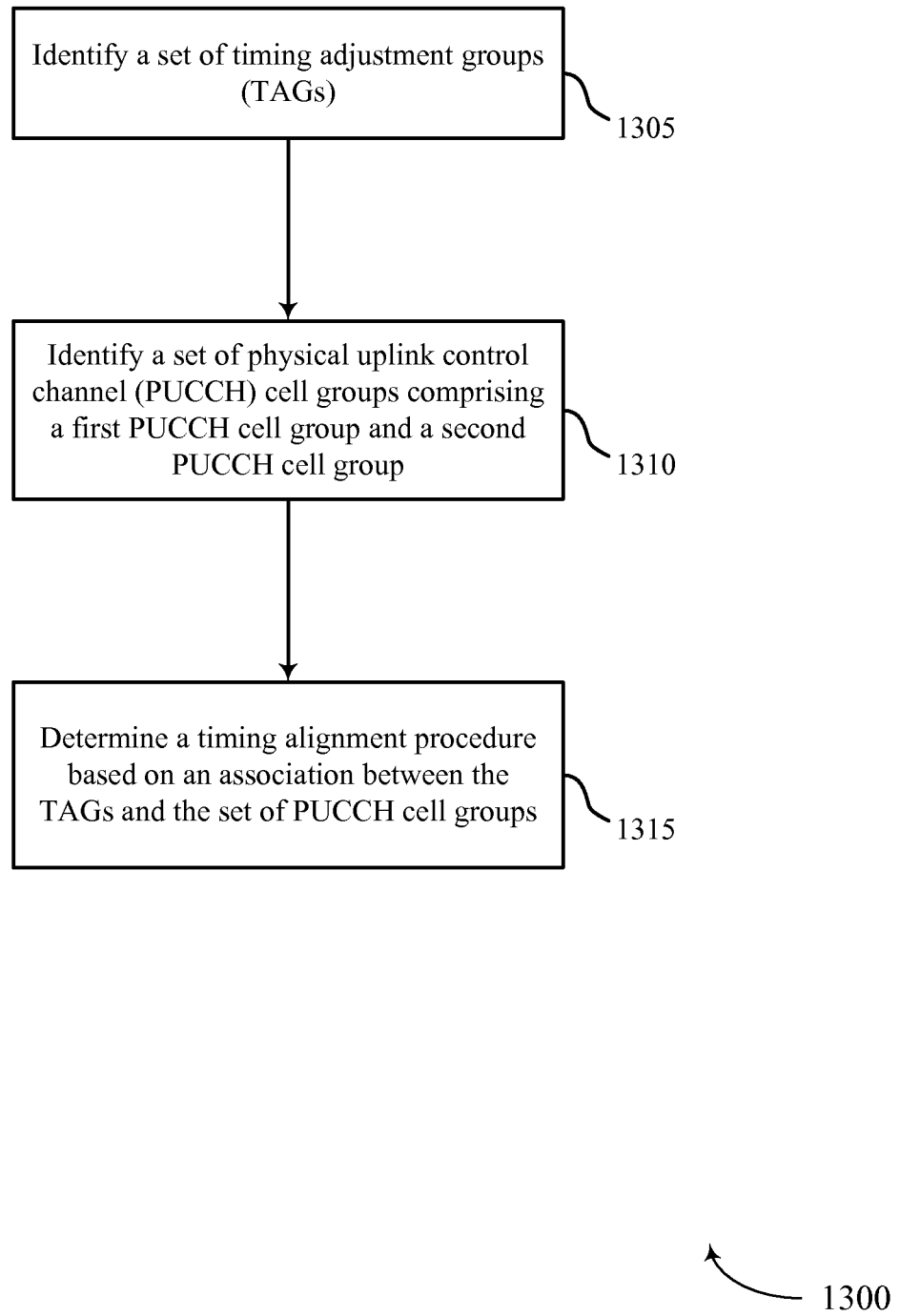
FIG. 13 shows a flowchart illustrating a method for timing alignment procedures for dual PUCCH in accordance with various aspects of the present disclosure.

FIG. 13 shows a flowchart illustrating a method 1300 for timing alignment procedures for dual PUCCH in accordance with various aspects of the present disclosure. The operations of method 1300 may be implemented by a UE 115 or its components, as described with reference to FIGS. 1-8. In certain examples, the operations of method 1300 may be performed by the timing alignment module 510 or 810 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may identify a set of TAGs as described above with reference to FIGS. 2-4. In certain examples, the operation(s) of block 1305 may be performed by the TAG identification module 605 as described above with reference to FIG. 6.

At block 1310, the UE 115 may identify a set of PUCCH cell groups comprising a first PUCCH cell group and a second PUCCH cell group as described above with reference to FIGS. 2-4. In certain examples, the operation(s) of block 1310 may be performed by the PUCCH CG identification module 610 as described above with reference to FIG. 6.

At block 1315, the UE 115 may determine a timing alignment procedure based on an association between the set of TAGs and the set of PUCCH cell groups as described above with reference to FIGS. 2-4. In certain examples, the operation(s) of block 1315 may be performed by the alignment processing module 615 as described above with reference to FIG. 6.

Figure 14:
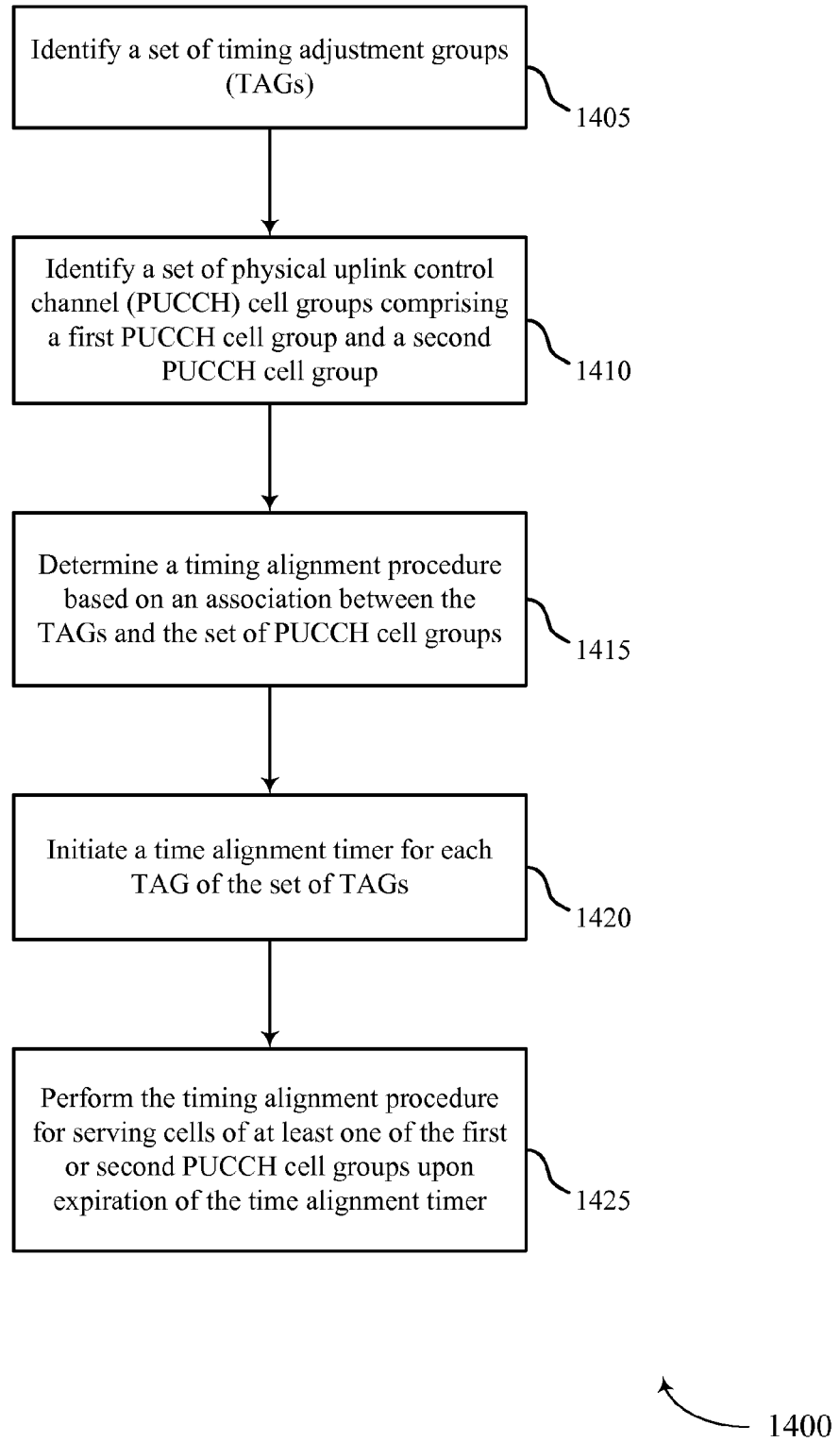
FIG. 14 shows a flowchart illustrating a method for timing alignment procedures for dual PUCCH in accordance with various aspects of the present disclosure.

FIG. 14 shows a flowchart illustrating a method 1400 for timing alignment procedures for dual PUCCH in accordance with various aspects of the present disclosure. The operations of method 1400 may be implemented by a UE 115 or its components, as described with reference to FIGS. 1-8. In certain examples, the operations of method 1400 may be performed by the timing alignment module 510 or 810 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may identify a set of TAGs as described above with reference to FIGS. 2-4. In certain examples, the operation(s) of block 1405 may be performed by the TAG identification module 605 as described above with reference to FIG. 6.

At block 1410, the UE 115 may identify a set of PUCCH cell groups comprising a first PUCCH cell group and a second PUCCH cell group as described above with reference to FIGS. 2-4. In certain examples, the operation(s) of block 1410 may be performed by the PUCCH CG identification module 610 as described above with reference to FIG. 6.

At block 1415, the UE 115 may determine a timing alignment procedure based on an association between the set of TAGs and the set of PUCCH cell groups as described above with reference to FIGS. 2-4. In certain examples, the operation(s) of block 1415 may be performed by the alignment processing module 615 as described above with reference to FIG. 6.

At block 1420, the UE 115 may initiate a time alignment timer for each TAG of the set of TAGs as described above with reference to FIGS. 2-4. In certain examples, the operation(s) of block 1420 may be performed by the time alignment timer 705 as described above with reference to FIG. 7.

At block 1425, the UE 115 may perform the timing alignment procedure for serving cells of at least one of the first or second PUCCH cell groups upon expiration of the time alignment timer as described above with reference to FIGS. 2-4. In certain examples, the operation(s) of block 1425 may be performed by the alignment processing module 615 as described above with reference to FIG. 6.

Figure 15:
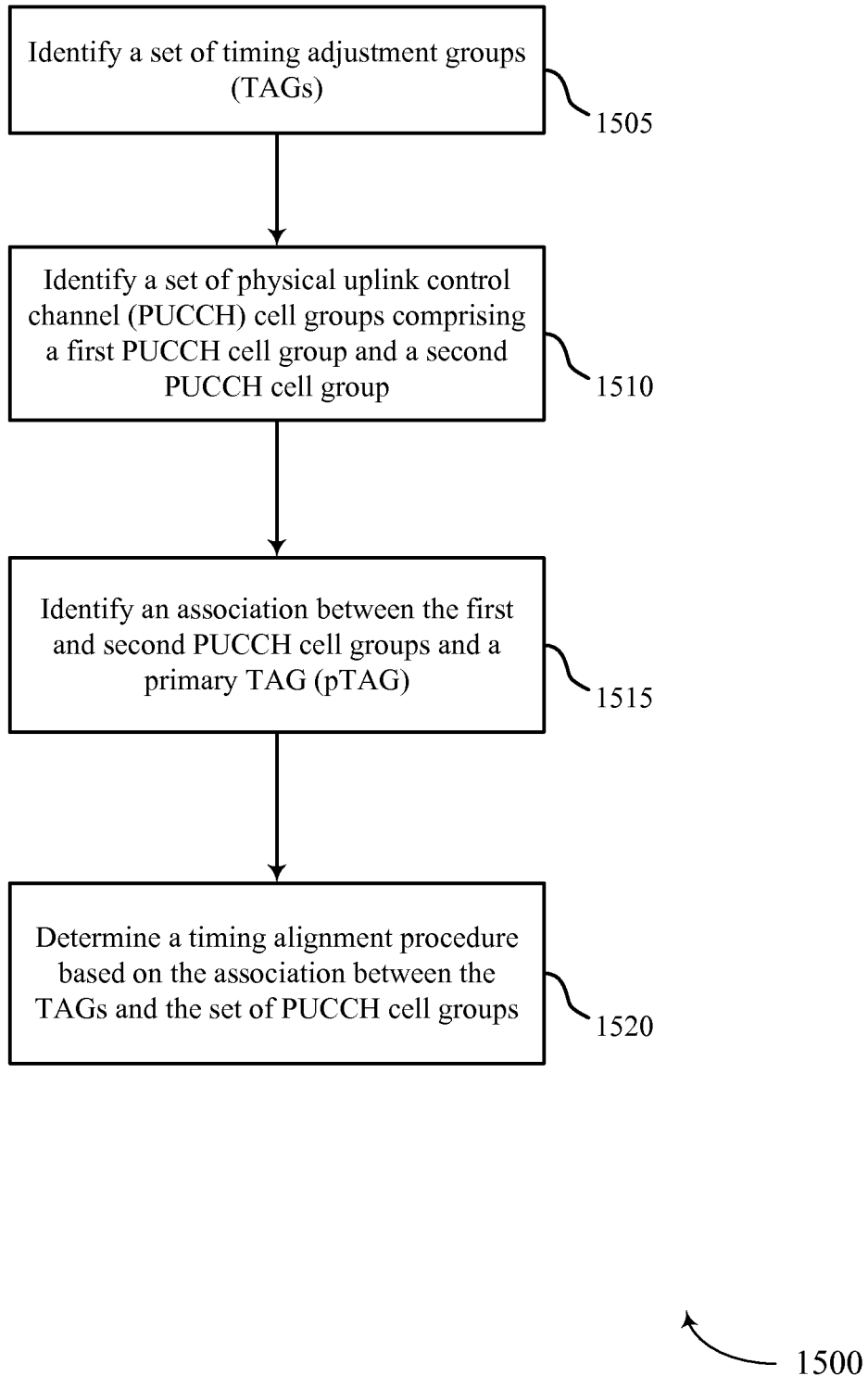
FIG. 15 shows a flowchart illustrating a method for timing alignment procedures for dual PUCCH in accordance with various aspects of the present disclosure.

FIG. 15 shows a flowchart illustrating a method 1500 for timing alignment procedures for dual PUCCH in accordance with various aspects of the present disclosure. The operations of method 1500 may be implemented by a UE 115 or its components, as described with reference to FIGS. 1-8. In certain examples, the operations of method 1500 may be performed by the timing alignment module 510 or 810 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 and 1400 of FIGS. 13 and 14.

At block 1505, the UE 115 may identify a set of TAGs as described above with reference to FIG. 2A. The set of TAGs may consist of the pTAG. In certain examples, the operation(s) of block 1505 may be performed by the TAG identification module 605 as described above with reference to FIG. 6.

At block 1510, the UE 115 may identify a set of PUCCH cell groups comprising a first PUCCH cell group and a second PUCCH cell group as described above with reference to FIGS. 2-4. In certain examples, the operation(s) of block 1510 may be performed by the PUCCH CG identification module 610 as described above with reference to FIG. 6.

At block 1515, the UE 115 may identify an association between the first and second PUCCH cell groups and a primary TAG (pTAG) as described above with reference to FIGS. 2-4. In certain examples, the operation(s) of block 1515 may be performed by the association identification module 710 as described above with reference to FIG. 7.

At block 1520, the UE 115 may determine a timing alignment procedure based on an association between the pTAG and the set of PUCCH cell groups as described above with reference to FIGS. 2-4. In certain examples, the operation(s) of block 1520 may be performed by the alignment processing module 615 as described above with reference to FIG. 6.

Figure 16:
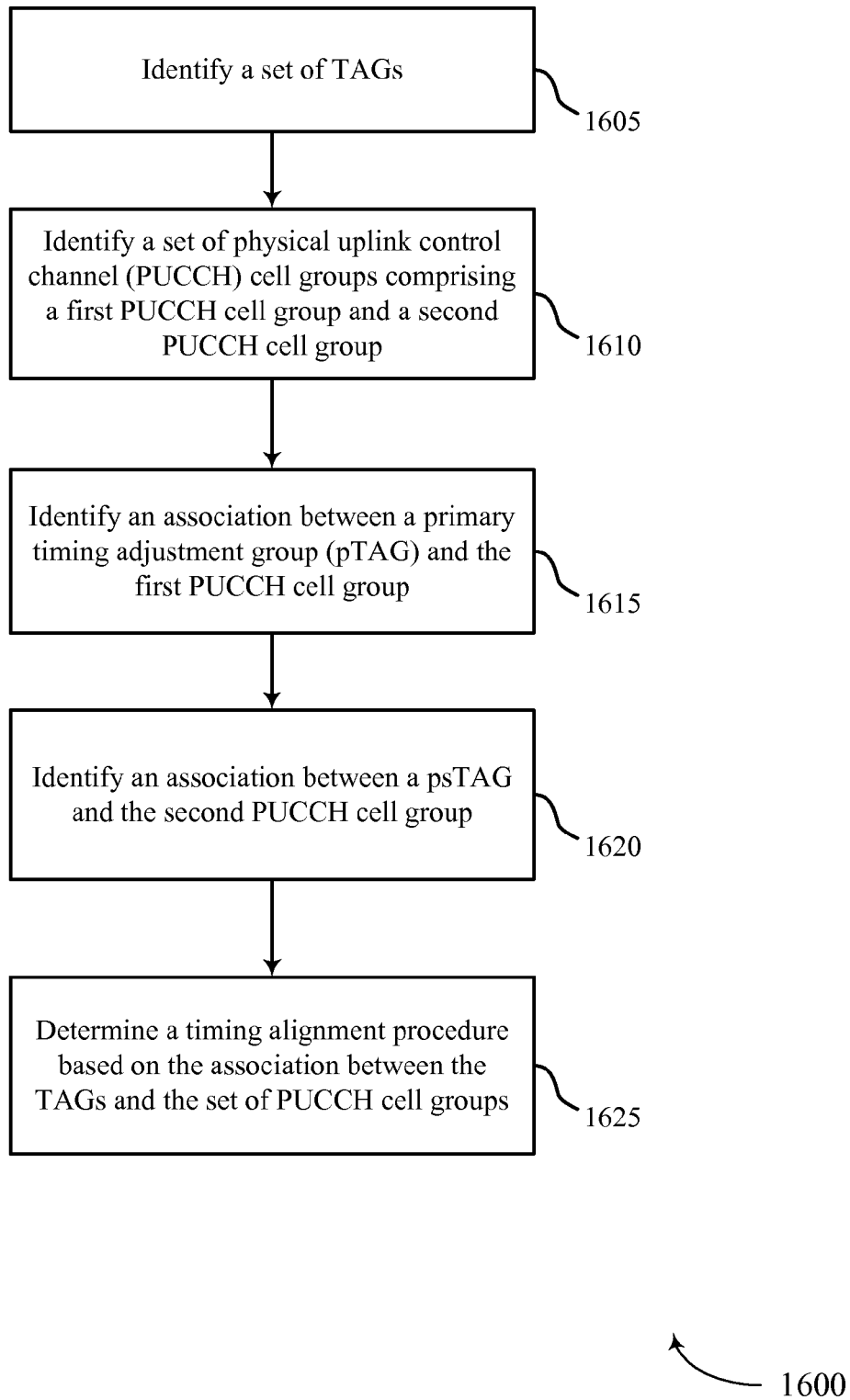
FIG. 16 shows a flowchart illustrating a method for timing alignment procedures for dual PUCCH in accordance with various aspects of the present disclosure.

FIG. 16 shows a flowchart illustrating a method 1600 for timing alignment procedures for dual PUCCH in accordance with various aspects of the present disclosure. The operations of method 1600 may be implemented by a UE 115 its components as described with reference to FIGS. 1-8. In certain examples, the operations of method 1600 may be performed by the timing alignment module 510 or 810 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may identify a set of TAGs as described above with reference to FIGS. 2B and 2C. The set of TAGs may include a pTAG and a psTAG. In certain examples, the operation(s) of block 1605 may be performed by the TAG identification module 605 as described above with reference to FIG. 6.

At block 1610, the UE 115 may identify a set of PUCCH cell groups including a first PUCCH cell group and a second PUCCH cell group as described above with reference to FIGS. 2-4. In certain examples, the operation(s) of block 1610 may be performed by the PUCCH CG identification module 610 as described above with reference to FIG. 6.

At block 1615, the UE 115 may identify an association between a primary TAG (pTAG) and the first PUCCH cell group as described above with reference to FIGS. 2-4. In certain examples, the operation(s) of block 1615 may be performed by the association identification module 710 as described above with reference to FIG. 7.

At block 1620, the UE 115 may identify an association between a PUCCH secondary TAG (psTAG) and the second PUCCH cell group as described above with reference to FIGS. 2-4. In certain examples, the operation(s) of block 1620 may be performed by the association identification module 710 as described above with reference to FIG. 7.

At block 1625, the UE 115 may determine a timing alignment procedure based on an association between the set of TAGs and the set of PUCCH cell groups as described above with reference to FIGS. 2-4. In certain examples, the operation(s) of block 1625 may be performed by the alignment processing module 615 as described above with reference to FIG. 6.

Figure 17:
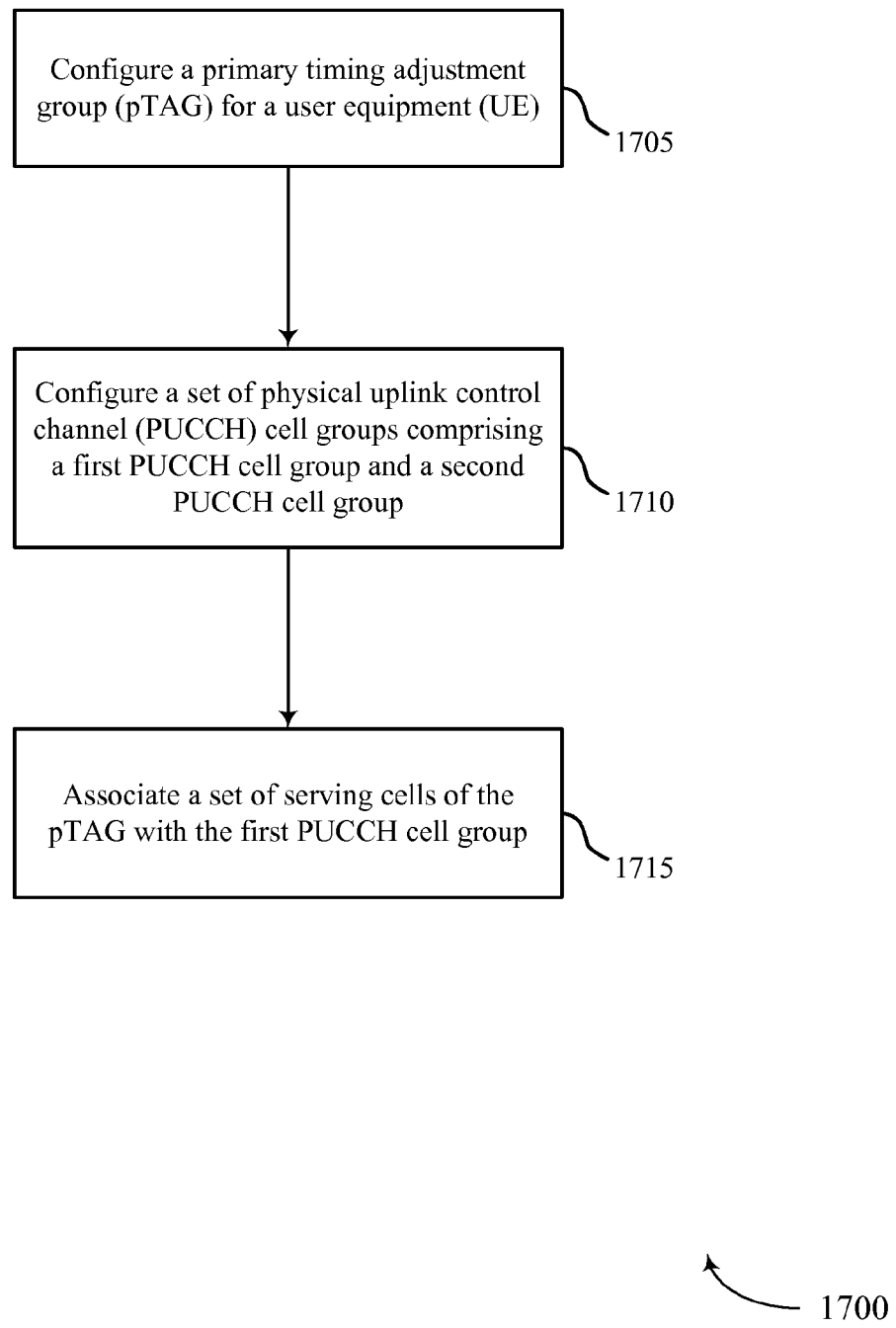
FIG. 17 shows a flowchart illustrating a method for timing alignment procedures for dual PUCCH in accordance with various aspects of the present disclosure.

FIG. 17 shows a flowchart illustrating a method 1700 for timing alignment procedures for dual PUCCH in accordance with various aspects of the present disclosure. The operations of method 1700 may be implemented by a base station 105 and its components as described with reference to FIGS. 1-12. In certain examples, the operations of method 1700 may be performed by the timing configuration module 910 or 1210 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1300, 1400, 1500, and 1600 of FIGS. 13-16.

At block 1705, the base station 105 may configure a primary timing adjustment group (pTAG) for a UE as described above with reference to FIGS. 2-4. In certain examples, the operation(s) of block 1705 may be performed by the TAG configuration module 1005 as described above with reference to FIG. 10.

At block 1710, the base station 105 may configure a set of PUCCH cell groups for the UE, the set of PUCCH cell groups comprising a first PUCCH cell group and a second PUCCH cell group as described above with reference to FIGS. 2-4. In certain examples, the operation(s) of block 1710 may be performed by the PUCCH CG configuration module 1010 as described above with reference to FIG. 10.

At block 1715, the base station 105 may associate a set of serving cells of the pTAG with the first PUCCH cell group as described above with reference to FIGS. 2-4. In certain examples, the operation(s) of block 1715 may be performed by the association module 1015 as described above with reference to FIG. 10.

Thus, methods 1300, 1400, 1500, 1600, and 1700 may provide for timing alignment procedures for dual PUCCH. It should be noted that methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 may be combined.

The detailed description set forth above in connection with the appended drawings describes exemplary embodiments and does not represent all the embodiments that may be implemented or that are within the scope of the claims. The term "example" or "exemplary" when used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of non-transitory computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving at least one configuration message from a base station;
   identifying a set of timing adjustment groups (TAGs) based at least in part on the at least one configuration message;
   identifying a set of physical uplink control channel (PUCCH) cell groups based at least in part on the at least one configuration message, the set of PUCCH cell groups comprising a first PUCCH cell group and a second PUCCH cell group, at least a first serving cell of the first PUCCH cell group supporting PUCCH transmissions for serving cells of the first PUCCH cell group, and at least a second serving cell of the second PUCCH cell group supporting PUCCH transmissions for serving cells of the second PUCCH cell group;
   identifying, based at least in part on the at least one configuration message, an association between a first TAG of the set of TAGs and the first PUCCH cell group and an association between a second TAG of the set of TAGs and the second PUCCH cell group; and
   determining a timing alignment procedure for at least one of the first or second PUCCH cell groups based at least in part on the corresponding identified association.

2. The method of claim 1, further comprising:
   initiating a time alignment timer for each TAG of the set of TAGs; and
   performing the timing alignment procedure for a subset of serving cells in the TAGs upon expiration of one of the time alignment timers, the subset of serving cells being of the first PUCCH cell group when the expired one of the timing alignment timers corresponds to the first TAG, the subset of serving cells being of the second PUCCH cell group when the expired one of the timing alignment timers corresponds to the second TAG.

3. The method of claim 2, wherein the timing alignment procedure comprises at least one of:
notifying a radio resource control (RRC) control entity to release a PUCCH in a PUCCH-enabled cell; notifying the RRC control entity to release a sounding reference signal (SRS); flushing a hybrid automatic repeat request (HARQ) buffer for a serving cell; clearing a downlink (DL) assignment for a serving cell; or clearing an uplink (UL) grant for a serving cell.

4. The method of claim 1, wherein identifying the association comprises:
identifying an association between the set of PUCCH cell groups and a primary TAG (pTAG);
wherein the set of TAGs consists of the pTAG.

5. The method of claim 4, further comprising:
initiating a time alignment timer for the pTAG; and
performing a timing alignment procedure for serving cells of the set of PUCCH cell groups upon expiration of the time alignment timer.

6. The method of claim 1, wherein:
the first TAG is a primary TAG (pTAG);
the second TAG is a PUCCH secondary TAG (psTAG); and
the set of TAGs comprises the pTAG and the psTAG.

7. The method of claim 6, further comprising:
initiating a first time alignment timer for the pTAG and a second time alignment timer for the psTAG; and
performing a timing alignment procedure for the serving cells of the first PUCCH cell group upon expiration of the first time alignment timer or for the serving cells of the second PUCCH cell group upon expiration of the second time alignment timer.

8. The method of claim 6, wherein identifying the association comprises:
identifying an association between a secondary TAG (sTAG) and either the first or second PUCCH cell groups;
wherein the set of TAGs comprises the sTAG.

9. The method of claim 6, wherein identifying the association comprises:
identifying an association between a third serving cell of a secondary TAG (sTAG) and the first PUCCH cell group; and
identifying an association between a fourth serving cell of the sTAG and the second PUCCH cell group;
wherein the set of TAGs comprises the sTAG.

10. The method of claim 9, further comprising:
initiating a first time alignment timer for the pTAG and a second time alignment timer for the psTAG; and
performing a time alignment procedure for the serving cells associated with the first PUCCH cell group upon expiration of the first time alignment timer or for the serving cells associated with the second PUCCH cell group upon expiration of the second time alignment timer.

11. The method of claim 1, wherein:
the serving cells of the first PUCCH cell group comprise a primary cell (PCell) that supports PUCCH transmissions for serving cells of the first PUCCH cell group; and
the serving cells of the second PUCCH cell group comprise a PUCCH-enabled secondary cell (PSCell) that supports PUCCH transmissions for serving cells of the second PUCCH cell group.

12. The method of claim 1, wherein the association between the set of TAGs and the set of PUCCH cell groups is asymmetric.

13. The method of claim 1, further comprising:
communicating, based at least in part on the determined timing alignment procedure, on the serving cells of the first PUCCH cell group and on the serving cells of the second PUCCH cell group.

14. A method of wireless communication at a base station, comprising:
configuring a primary timing adjustment group (pTAG) for a user equipment (UE);
configuring a set of physical uplink control channel (PUCCH) cell groups for the UE, the set of PUCCH cell groups comprising a first PUCCH cell group and a second PUCCH cell group, at least a first serving cell of the first PUCCH cell group supporting PUCCH transmissions for serving cells of the first PUCCH cell group, and at least a second serving cell of the second PUCCH cell group supporting PUCCH transmissions for serving cells of the second PUCCH cell group;
associating a first set of serving cells of the pTAG with the first PUCCH cell group; and
transmitting, to the UE, at least one configuration message indicating information related to an association between the pTAG and the first and second PUCCH cell groups based at least in part on the associating.

15. The method of claim 14, further comprising:
associating a second set of serving cells of the pTAG with the second PUCCH cell group.

16. The method of claim 14, further comprising:
configuring a PUCCH secondary timing adjustment group (TAG) (psTAG) for the UE; and
associating the psTAG with the second PUCCH cell group.

17. The method of claim 16, further comprising:
configuring a secondary TAG (sTAG) for the UE; and
associating the sTAG with either the first or second PUCCH cell groups.

18. The method of claim 16, further comprising:
configuring a secondary TAG (sTAG) for the UE;
associating a first set of serving cells of the sTAG with the first PUCCH cell group; and
associating a second set of serving cells of the sTAG with the second PUCCH cell group.

19. The method of claim 14, wherein:
the serving cells of the first PUCCH cell group comprise a primary cell (PCell) that supports PUCCH transmissions for serving cells of the first PUCCH cell group; and
the serving cells of the second PUCCH cell group comprise a PUCCH-enabled secondary cell (PSCell) that supports PUCCH transmissions for serving cells of the second PUCCH cell group.

20. The method of claim 14, further comprising:
initiating a time alignment timer for the pTAG and a PUCCH secondary TAG (psTAG).

21. The method of claim 14, further comprising:
initiating a time alignment timer for a secondary TAG (sTAG).

22. An apparatus for wireless communication at a user equipment (UE), comprising:
a processor;
memory in electronic communication with the processor; and instructions stored in the memory, wherein the instructions are executable by the processor to cause the apparatus to:
receive at least one configuration message from a base station;
identify a set of timing adjustment groups (TAGs) based at least in part on the at least one configuration message;
identify a set of physical uplink control channel (PUCCH) cell groups based at least in part on the at least one configuration message, the set of PUCCH cell groups comprising a first PUCCH cell group and a second PUCCH cell group, at least a first serving cell of the first PUCCH cell group supporting PUCCH transmissions for serving cells of the first PUCCH cell group, and at least a second serving cell of the second PUCCH cell group supporting PUCCH transmissions for serving cells of the second PUCCH cell group;
identify, based at least in part on the at least one configuration message, an association between a first TAG of the set of TAGs and the first PUCCH cell group and an association between a second TAG of the set of TAGs and the second PUCCH cell group; and
determine a timing alignment procedure for at least one of the first or second PUCCH cell groups based at least in part on the corresponding identified association.

23. The apparatus of claim 22, wherein the instructions are executable by the processor to cause the apparatus to:
initiate a time alignment timer for each TAG of the set of TAGs; and
perform the timing alignment procedure for a subset of serving cells in the TAGs upon expiration of one of the time alignment timers, the subset of serving cells being of the first PUCCH cell group when the expired one of the timing alignment timers corresponds to the first TAG, the subset of serving cells being of the second PUCCH cell group when the expired one of the timing alignment timers corresponds to the second TAG.

24. The apparatus of claim 23, wherein the timing alignment procedure comprises at least one of:
notifying a radio resource control (RRC) control entity to release a PUCCH in a PUCCH-enabled cell; notifying the RRC control entity to release an SRS; flushing a hybrid automatic repeat request (HARQ) buffer for a serving cell; clearing a downlink (DL) assignment for a serving cell; or clearing an uplink (UL) grant for a serving cell.

25. The apparatus of claim 22, wherein the instructions are executable by the processor to cause the apparatus to:
identify an association between the set of PUCCH cell groups and a primary TAG (pTAG);
wherein the set of TAGs consists of the pTAG.

26. The apparatus of claim 22, wherein:
the first TAG is a primary TAG (pTAG);
the second TAG is a PUCCH secondary TAG (psTAG); and
the set of TAGs comprises the pTAG and the psTAG.

27. The apparatus of claim 22, wherein:
the serving cells of the first PUCCH cell group comprise a primary cell (PCell); and
the serving cells of the second PUCCH cell group comprise a PUCCH-enabled secondary cell (PSCell).

28. The apparatus of claim 22, wherein the instructions are executable by the processor to cause the apparatus to:
communicate, based at least in part on the determined timing alignment procedure, on the serving cells of the first PUCCH cell group and on the serving cells of the second PUCCH cell group.

29. An apparatus for wireless communication at a base station, comprising:
a processor;
memory in electronic communication with the processor; and
instructions stored in the memory, wherein the instructions are executable by the processor to cause the apparatus to:
configure a primary timing adjustment group (pTAG) for a user equipment (UE);
configure a set of physical uplink control channel (PUCCH) cell groups for the UE, the set of PUCCH cell groups comprising a first PUCCH cell group and a second PUCCH cell group, at least a first serving cell of the first PUCCH cell group supporting PUCCH transmissions for serving cells of the first PUCCH cell group, and at least a second serving cell of the second PUCCH cell group supporting PUCCH transmissions for serving cells of the second PUCCH cell group;
associate a first set of serving cells of the pTAG with the first PUCCH cell group; and
transmit, to the UE, at least one configuration message indicating information related to an association between the pTAG and the first and second PUCCH cell groups based at least in part on the associating.

30. The apparatus of claim 29, wherein the instructions are executable by the processor to cause the apparatus to:
associate a second set of serving cells of the pTAG with the second PUCCH cell group.

31. The apparatus of claim 29, wherein the instructions are executable by the processor to cause the apparatus to:
configure a PUCCH secondary timing adjustment group (TAG) (psTAG) for the UE; and
associate the psTAG with the second PUCCH cell group.

32. The apparatus of claim 29, wherein:
the first PUCCH cell group is a set of serving cells comprising a primary cell (PCell); and
the second PUCCH cell group is a set of serving cells comprising a PUCCH-enabled secondary cell (PSCell).

* * * * *